US012769506B2

(12) United States Patent
Shim et al.

(10) Patent No.: US 12,769,506 B2
(45) Date of Patent: Oct. 20, 2026

(54) ELECTRONIC APPARATUS PERFORMING DO NOT CONTROL MODE FOR MULTIPLE USERS AND CONTROLLING METHOD THEREOF

(71) Applicant: Samsung Electronics Co., Ltd., Suwon-si (KR)

(72) Inventors: Sojeong Shim, Suwon-si (KR); Hoon Han, Suwon-si (KR); Jeewoo Noh, Suwon-si (KR); Hyunil Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 18/795,742

(22) Filed: Aug. 6, 2024

(65) Prior Publication Data

US 2025/0123795 A1 Apr. 17, 2025

Related U.S. Application Data

(63) Continuation of application No. PCT/KR2024/010387, filed on Jul. 18, 2024.

(30) Foreign Application Priority Data

Oct. 12, 2023 (KR) ........................ 10-2023-0135998

(51) Int. Cl.
*G06F 3/16* (2006.01)
*G05D 1/229* (2024.01)
(Continued)

(52) U.S. Cl.
CPC ........... *G06F 3/165* (2013.01); *G05D 1/2297* (2024.01); *G06F 3/013* (2013.01); *G05D 2107/40* (2024.01)

(58) Field of Classification Search
CPC ....... G06F 3/165; G06F 3/013; G05D 1/2297; G05D 2107/40
See application file for complete search history.

(56) References Cited

U.S. PATENT DOCUMENTS 9,934,673 B2 4/2018 Hou et al.
10,095,191 B2 10/2018 Heo et al.
(Continued)

FOREIGN PATENT DOCUMENTS

CN 106338992 A * 1/2017 ......... H04L 12/2816
CN 106356073 A * 1/2017 ......... G10L 21/0208
(Continued)

OTHER PUBLICATIONS

International Search and written opinion dated Oct. 24, 2024 issued in International Application No. PCT/KR2024/010387.
(Continued)

*Primary Examiner* — Joseph Saunders, Jr.
(74) *Attorney, Agent, or Firm* — Jefferson IP Law, LLP

(57) ABSTRACT

An electronic apparatus is provided. The electronic apparatus includes a display, a sensor, a moving device moving the electronic apparatus, memory storing at least one instruction, and at least one processor that is connected with the display, the sensor, the moving device, and the memory, wherein the at least one instruction, when executed by the at least one processor, causes the electronic apparatus to identify a set state of a Do Not Disturb mode for each of a plurality of users using the electronic apparatus, and based on a predetermined event occurring, perform an operation corresponding to the event to a user who did not set the Do Not Disturb mode.

21 Claims, 26 Drawing Sheets

(51) Int. Cl.
*G06F 3/01* (2006.01)
*G05D 107/40* (2024.01)

(56) References Cited

U.S. PATENT DOCUMENTS

| | | | |
|---|---|---|---|
| 10,819,844 | B2 | 10/2020 | Kim et al. |
| 10,893,245 | B1 | 1/2021 | Choi et al. |
| 11,069,082 | B1 | 7/2021 | Ebrahimi Afrouzi et al. |
| 11,971,721 | B2 | 4/2024 | Takai et al. |
| 12,468,305 | B2 | 11/2025 | Choi et al. |
| 2014/0207282 | A1 | 7/2014 | Angle et al. |
| 2017/0092111 | A1 | 3/2017 | Hou et al. |
| 2017/0160703 | A1 | 6/2017 | Heo et al. |
| 2020/0341477 | A1 | 10/2020 | Baek et al. |
| 2021/0034079 | A1* | 2/2021 | Yamaguchi .......... G05D 1/0094 |
| 2021/0114218 | A1 | 4/2021 | Kim et al. |

FOREIGN PATENT DOCUMENTS

| | | | |
|---|---|---|---|
| KR | 10-2014-0028426 | A | 3/2014 |
| KR | 10-2017-0048233 | A | 5/2017 |
| KR | 10-2017-0066034 | A | 6/2017 |
| KR | 10-2018-0134628 | A | 12/2018 |
| KR | 10-2019-0093731 | A | 8/2019 |
| KR | 10-2015030 | B1 | 8/2019 |
| KR | 10-2019-0103084 | A | 9/2019 |
| KR | 10-2021-0045022 | A | 4/2021 |
| KR | 10-2336246 | B1 | 12/2021 |
| KR | 10-2023-0039421 | A | 3/2023 |
| KR | 10-2023-0045357 | A | 4/2023 |
| KR | 10-2023-0053964 | A | 4/2023 |
| WO | 2023/091160 | A1 | 5/2023 |

OTHER PUBLICATIONS

Extended European Search Report dated Jun. 23, 2026, issued in European Application No. 24877361.6-1218.

* cited by examiner

ELECTRONIC APPARATUS PERFORMING DO NOT CONTROL MODE FOR MULTIPLE USERS AND CONTROLLING METHOD THEREOF

CROSS-REFERENCE TO RELATED APPLICATION(S)

This application is a continuation application, claiming priority under 35 U.S.C. § 365 (c), of an International application No. PCT/KR2024/010387, filed on Jul. 18, 2024, which is based on and claims the benefit of a Korean patent application number 10-2023-0135998, filed on Oct. 12, 2023, in the Korean Intellectual Property Office, the disclosure of which is incorporated by reference herein in its entirety

BACKGROUND OF THE INVENTION

1. Field

The disclosure relates to an electronic apparatus and a controlling method thereof. More particularly, the disclosure relates to an electronic apparatus that can set a Do Not Disturb mode for each user, and a controlling method thereof.

2. Description of the Related Art

Recently, an electronic apparatus can provide various services. However, depending on cases, an operation in a provision process of the services can become an interference to a user, and thus setting of a Do Not Disturb mode (or stopping of notification) is supported.

However, as such a Do Not Disturb mode is applied in an apparatus unit, it is difficult to perform an appropriate operation in case a plurality of users use one apparatus.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus that can set a Do Not Disturb mode for each user, and a controlling method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a display, a sensor, a moving device moving the electronic apparatus, memory storing at least one instruction, and at least one processor that is connected with the display, the sensor, the moving device, and the memory, wherein the at least one instruction, when executed by the at least one processor, causes the electronic apparatus to identify a set state of a Do Not Disturb mode for each of a plurality of users using the electronic apparatus, and, based on a predetermined event occurring, perform an operation corresponding to the event to a user who did not set the Do Not Disturb mode.

The at least one processor may, based on recognizing a user who set the Do Not Disturb mode around the electronic apparatus, perform the operation corresponding to the event in the Do Not Disturb mode.

The at least one processor may, based on an event of providing an image to a first user who did not set the Do Not Disturb mode occurring, control the moving device such that the electronic apparatus moves to the surroundings of the first user, and control the display to display an image corresponding to the event.

The at least one processor may, based on identifying that a second user who set the Do Not Disturb mode is located within a predetermined distance, control the moving device such that the electronic apparatus moves to a location that does not fall under a gaze area of the second user among the ambient areas of the first user.

The electronic apparatus further includes a speaker, and the at least one processor may, based on an event of providing predetermined information to a user occurring, control the moving device such that the electronic apparatus moves to the surroundings of a first user who did not set the Do Not Disturb mode, and control the speaker to output a sound corresponding to the event.

The at least one processor may, based on identifying that a second user who set the Do Not Disturb mode is located within a predetermined distance, reduce an output volume of the sound corresponding to the event, and control the speaker to output the sound corresponding to the event in the reduced output volume.

The at least one processor may determine the output volume based on the distance from the second user, and based on the determined output volume being lower than a recognizable volume of the first user, control the display to display visual information corresponding to the sound to be output.

The at least one processor may, based on an event of moving to the surroundings of a first user who did not set the Do Not Disturb mode occurring, control the moving device such that the electronic apparatus moves to the surroundings of the first user, and based on recognizing a second user who set the Do Not Disturb mode during the moving, control the moving device such that the electronic apparatus moves in a moving route distanced from the second user as much as a predetermined distance.

The at least one processor may, based on an event of moving to the surroundings of a first user who did not set the Do Not Disturb mode occurring, set a moving route for moving to the surroundings of the first user, and control the moving device such that the electronic apparatus moves along the set moving route, and in a section wherein a distance from a second user who set the Do Not Disturb mode becomes within a predetermined distance on the moving route, control the moving device such that the electronic apparatus moves by reducing a moving speed of the electronic apparatus.

The at least one processor may obtain a gaze area of the second user, and set a moving route such that the moving route is not included in the gaze area.

The electronic apparatus further includes a microphone, and the sensor includes a camera, and the at least one processor may identify a speaker by using a voice input through the microphone and an image photographed through the camera, and based on an input voice command, set the Do Not Disturb mode for the identified speaker or a user included in the voice command.

The sensor includes a camera, and the at least one processor may identify a user by using an image photographed through the camera, and based on a posture of the user being a predetermined posture, set the Do Not Disturb mode for the identified user.

The electronic apparatus further includes a communication device communicating with a user terminal apparatus, and the at least one processor receives setting information related to a Do Not Disturb mode for a user of the user terminal apparatus from the user terminal apparatus, and set the Do Not Disturb mode for the user based on the received setting information.

The setting information related to the Do Not Disturb mode includes information on whether the Do Not Disturb mode is applied for each of a plurality of types of notifications.

The electronic apparatus further includes a communication device communicating with a user terminal apparatus, and identify a distance to the user terminal apparatus and a user of the user terminal apparatus, and based on the user of the user terminal apparatus being a user who set the Do Not Disturb mode, and the distance to the user terminal apparatus being within a predetermined distance, perform an operation of the electronic apparatus in the Do Not Disturb mode.

The memory includes map information for a space wherein the electronic apparatus is located, and the at least one processor identifies a space wherein a user who set the Do Not Disturb mode is located among a plurality of spaces in the map, and operate in the Do Not Disturb mode in the space wherein the user who set the Do Not Disturb mode is located.

The at least one processor may control the display such that, based on a volume or an image corresponding to the Do Not Disturb mode being displayed to a first user who did not set the Do Not Disturb mode, information notifying that a user who set the Do Not Disturb mode is located in the surroundings is displayed.

The at least one processor may control the display such that, based on a user who set the Do Not Disturb mode approaching the electronic apparatus within a predetermined distance, a user interface window inquiring about release of the Do Not Disturb mode is displayed.

In accordance with another aspect of the disclosure, a controlling method of a movable electronic apparatus is provided. The controlling method includes storing a setting for a Do Not Disturb mode for each of a plurality of users using the electronic apparatus, and based on a predetermined event occurring, performing an operation corresponding to the event to a first user who did not set the Do Not Disturb mode, and in the performing the operation corresponding to the event, based on recognizing a second user who set the Do Not Disturb mode around the electronic apparatus, the operation corresponding to the event is performed in the Do Not Disturb mode.

In accordance with another aspect of the disclosure, one or more non-transitory computer-readable recording media storing one or more computer programs including computer executable instructions that, when executed by one or more processors of a movable electronic apparatus individually or collectively, cause the movable electronic apparatus to perform operations is provided. The operations include storing a setting for a Do Not Disturb mode for each of a plurality of users using the electronic apparatus, and, based on a predetermined event occurring, performing an operation corresponding to the event to a first user who did not set the Do Not Disturb mode, wherein in the performing of the operation corresponding to the event, based on recognizing a second user who set the Do Not Disturb mode around the electronic apparatus, the operation corresponding to the event is performed in the Do Not Disturb mode.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will become apparent from the following description taken in conjunction with reference to the accompanying drawings, in which.

The same reference numerals are used to represent the same elements throughout the drawings.

DETAILED DESCRIPTION

Figure 1:
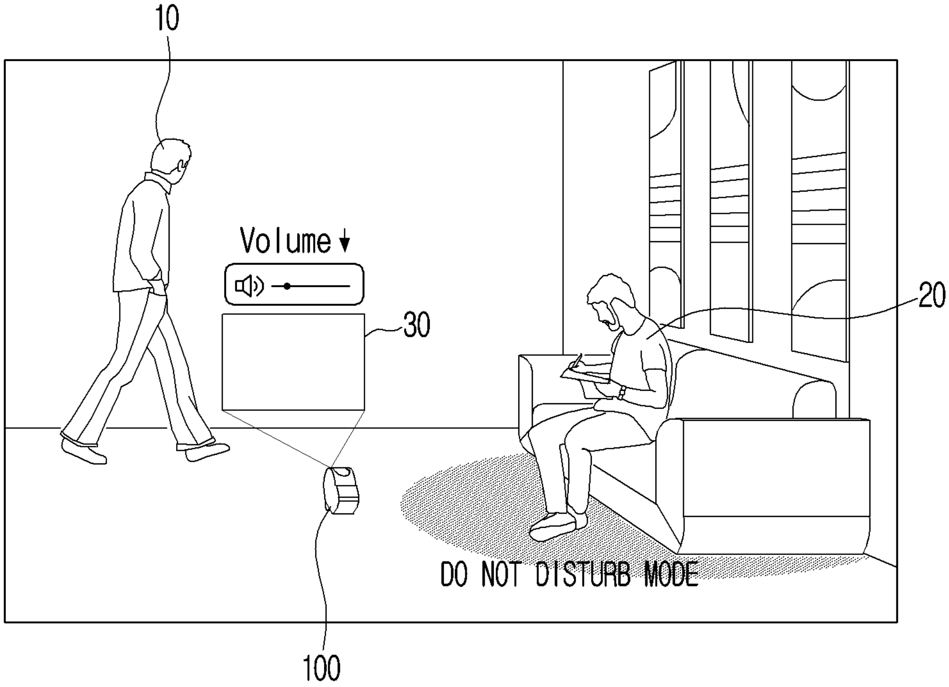
FIG. 1 is a diagram for illustrating an operation of an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, in case it is determined that in describing embodiments, detailed explanation of related known functions or features may unnecessarily confuse the gist of the disclosure, the detailed explanation will be omitted.

In addition, the embodiments below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Further, the terms used in the disclosure are used only to explain specific embodiments, and are not intended to limit the scope of the disclosure. In addition, singular expressions include plural expressions, unless defined obviously differently in the context.

Also, in the disclosure, expressions such as "have," "may have," "include," and "may include" denote the existence of such characteristics (e.g.: elements such as numbers, functions, operations, and components), and do not exclude the existence of additional characteristics.

In addition, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Further, the expressions "first," "second," and the like used in the disclosure may describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" may not necessarily mean that an apparatus is "specifically designed to" in terms of hardware.

Instead, under some circumstances, the expression "an apparatus configured to" may mean that the apparatus "is capable of" performing an operation together with another apparatus or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Also, in the embodiments of the disclosure, 'a module' or 'a part' may perform at least one function or operation, and may be implemented as hardware or software, or as a combination of hardware and software. In addition, a plurality of 'modules' or 'parts' may be integrated into at least one module and implemented as at least one processor, excluding 'a module' or 'a part' that needs to be implemented as specific hardware.

Further, operations performed by a module, a program, or other components according to the various embodiments may be executed sequentially, in parallel, repetitively, or heuristically. Or, at least some of the operations may be executed in a different order or omitted, or other operations may be added.

Meanwhile, various elements and areas in drawings were illustrated schematically. Accordingly, the technical idea of the disclosure is not limited by the relative sizes or intervals illustrated in the accompanying drawings.

Meanwhile, an electronic apparatus according to the various embodiments of the disclosure may include, for example, at least one of a smartphone, a tablet personal computer (PC), a desktop PC, or a laptop PC.

Also, in some embodiments, an electronic apparatus may include, for example, at least one of a television, a digital video disk (DVD) player, an audio, a refrigerator, an air conditioner, a cleaner, an oven, a microwave oven, a washing machine, an air purifier, a robot cleaner, a set-top box, a home automation control panel, a security control panel, a media box (e.g.: Samsung HomeSync™, Apple TV™, or Google TV™), a game console (e.g.: Xbox™, PlayStation™), an electronic dictionary, an electronic key, a camcorder, or an electronic photo frame.

Hereinafter, embodiments according to the disclosure will be described in detail with reference to the accompanying drawings, such that those having ordinary skill in the art to which the disclosure belongs can easily carry out the disclosure.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 is a diagram for illustrating an operation of an electronic apparatus according to an embodiment of the disclosure.

Referring to FIG. 1, a plurality of users 10, 20 are illustrated. The plurality of users may have different states from each other regarding the electronic apparatus 100. For example, a first user 10 may be in a general state, i.e., a state wherein it is okay to be provided with a notification, etc. However, a second user 20 may be in a state wherein the user does not want to be interfered as the user is concentrating on a specific behavior.

In a conventional environment, in order that the second user 20 could prevent interference from the electronic apparatus 100, the user 20 had to stop the functions of the electronic apparatus 100 (e.g., setting of mute, inactivating the operations of the robot or converting the robot to a dormancy state).

If the functions of the electronic apparatus 100 are stopped as above, the second user 20 may not be interfered. However, the other user 10 except the second user 20 may not be able to use the functions of the electronic apparatus 100.

Also, if the first user 10 releases the stopping of the functions as above for using the electronic apparatus 100, the second user 20 may be interfered by the operations of the electronic apparatus 100.

For resolving such a problem, in the disclosure, a function of supporting a Do Not Disturb mode for each user is supported. Here, the Do Not Disturb mode may also be referred to as a notification prohibition mode, a concentration mode, an access prohibition mode, etc.

For example, in the illustrated situation, if the Do Not Disturb mode was set for the second user 20, and the Do Not Disturb mode was not set for the first user 10, the electronic apparatus 100 may perform an operation corresponding to a request of the first user 10.

However, in case the second user 20 who set the Do Not Disturb mode is located in the surroundings, in a process of providing a notification (or a service) to the first user 10, the electronic apparatus 100 may perform the operation in a limited state such that the notification does not interfere with the second user 20. For example, the electronic apparatus 100 may perform an operation of outputting a notification content while reducing the volume, or displaying an image 30 in an area not visible from the gaze of the second user 20. Here, the notification is an operation of displaying specific information to the user as a sound and/or a message, and it may provide information that a specific time has come, information that a specific situation occurred, etc. Also, the aforementioned operation may be applied not only in providing specific information, but also in a process of performing content reproduction, music reproduction, etc.

Hereinafter, for making explanation easy, an operation in a general state will be referred to as an operation in the general mode, and an operation in a state different from the general mode will be referred to as an operation in the Do Not Disturb mode.

Here, an operation in the Do Not Disturb mode may include an operation of using a volume lower than a volume in the general mode, or displaying an image while avoiding a gaze direction of a user who set the Do Not Disturb mode, and an operation of reducing the moving speed in the surroundings of where the Do Not Disturb mode was set (or within a predetermined distance from a user who set the Do Not Disturb mode), or not approaching the surroundings, etc. Each detailed operation will be described in detail in FIGS. 6 to 22 that will be described below.

The electronic apparatus 100 according to the disclosure can set the Do Not Disturb mode for each user, and thus a user who did not set the Do Not Disturb mode can use the functions of the electronic apparatus 100, and accordingly, user convenience is improved.

Also, in case a user who set the Do Not Disturb mode exists in the surroundings, the electronic apparatus 100 can perform an operation while minimizing influence to the user, and thus inconvenience of the user who set the Do Not Disturb mode can be minimized.

Figure 2:
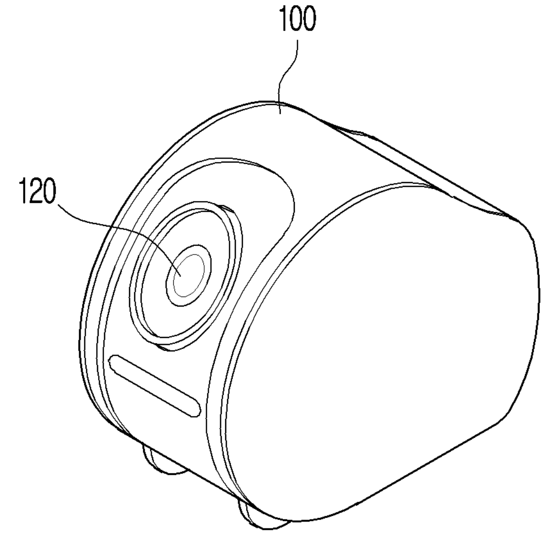
FIG. 2 is a diagram for illustrating a form of an electronic apparatus according to an embodiment of the disclosure.

FIG. 2 is a diagram for illustrating a form of an electronic apparatus according to an embodiment of the disclosure.

Referring to FIG. 2, an electronic apparatus 100 in a movable form is illustrated. However, this is merely an example of the illustrated form, and the electronic apparatus 100 may have a different shape from the illustrated form.

The electronic apparatus 100 may include a display 120 on the front surface.

The display 120 in the illustrated example is a projector type that projects and displays an image. Accordingly, the electronic apparatus 100 may display an image by projecting an image on a wall surface or a bottom surface, etc.

Hereinafter, explanation will be described by assuming that the display 120 projects an image in a projector form, but in actual implementation, the display 120 may also be implemented as a component displaying an image on a specific surface of the electronic apparatus 100 (e.g., a liquid crystal display (LCD), organic light emitting diodes (OLEDs), micro-light-emitting diodes (LEDs), etc.) but not a projector form. Meanwhile, in the illustrated example, it was illustrated that one display 120 is arranged on the front surface of the electronic apparatus 100, but in actual implementation, a plurality of displays may be arranged on the electronic apparatus 100.

The electronic apparatus 100 may include a driving means for moving (e.g., a motor, wheels), and perform moving by using the provided driving means. Meanwhile, in the illustrated example, it was illustrated and explained that the electronic apparatus 100 is moved by using wheels, but in actual implementation, it is also possible to user another means in a caterpillar form, and in case the electronic apparatus 100 is implemented as a drone, etc., it is also possible that a propeller is mounted instead of wheels.

Meanwhile, in the illustrated example, it was illustrated that the electronic apparatus 100 includes a driving means in itself, but the driving means may be a separate apparatus. For example, the electronic apparatus 100 may be coupled with an apparatus that can move such as a robot cleaner, and may be mounted on a robot cleaner, and operate by controlling the moving of the robot cleaner.

Meanwhile, the illustrated form of the electronic apparatus 100 is merely an example, and the electronic apparatus 100 may be implemented in various forms. Regarding specific components constituting the electronic apparatus 100, explanation will be described below with reference to FIG. 3.

Figure 3:
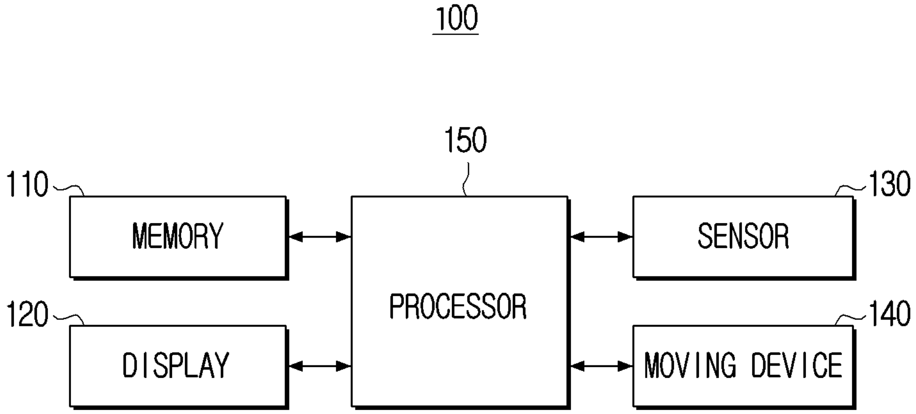
FIG. 3 is a block diagram for illustrating a configuration of an electronic apparatus according to an embodiment of the disclosure.

FIG. 3 is a block diagram for illustrating a configuration of an electronic apparatus according to an embodiment of the disclosure.

Referring to FIG. 3, the electronic apparatus 100 may include memory 110, a display 120, a sensor 130, a moving device 140, and a processor 150.

The memory 110 may store data necessary for various embodiments. The memory 110 may be implemented in a form of memory embedded in the electronic apparatus 100, or implemented in a form of memory that can be attached to or detached from the electronic apparatus 100 according to the usage of stored data.

For example, in the case of data for operating the electronic apparatus 100, the data may be stored in memory embedded in the electronic apparatus 100, and in the case of data for an extended function of the electronic apparatus 100, the data may be stored in memory that can be attached to or detached from the electronic apparatus 100.

Meanwhile, in the case of memory embedded in the electronic apparatus 100, the memory may be implemented as at least one of a volatile memory (e.g.: a dynamic random access memory (RAM) (DRAM), a static RAM (SRAM), or a synchronous dynamic RAM (SDRAM), etc.) or a non-volatile memory (e.g.: an one time programmable read only memory (ROM) (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)).

Also, in the case of memory that can be attached to or detached from the electronic apparatus 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.) and an external memory that can be connected to a USB port (e.g., a USB memory), etc.

The memory 110 may include various kinds of instructions necessary for the operations of the processor 150. Here, instructions may include an instruction for identifying a projection area wherein projection is possible in the ambient environment, an instruction for processing change of a projection area, an instruction for a keystone correction, an instruction for user voice recognition or voice processing, an instruction for processing an image, an instruction for controlling moving of the electronic apparatus 100, an instruction for managing the Do Not Disturb mode for each user, etc.

The memory 110 may store map information. Here, the map information is information on the space wherein the electronic apparatus 100 is located, and may be information on a space divided into a plurality of areas. For example, in case the electronic apparatus 100 is located in a home, the map information may have been generated based on a plan view for the home. Such map information may be directly generated by the electronic apparatus 100, or map information generated in another electronic apparatus (e.g., a robot cleaner) may be received and used.

Here, the memory 110 may further store additional information for each space by using information in the map information. Also, the memory 110 may store information for a location wherein a user who set the Do Not Disturb mode is located. For example, in an environment having spaces such as a living room, a room 1, a room 2, and a room 3, in case it is currently recognized that a user who set the Do Not Disturb mode is located in the room 1, the memory 110 may store information that the room 1 is a space wherein interference is prohibited.

Also, the memory 110 may store information on projection areas that can be used when projecting an image in each space. For example, the display 120 according to the disclosure may be a projector that operates in a projection form. In such a case, projection areas wherein an image can be projected may be identified every time and used, but as spaces in a home do not change greatly, projection areas identified in an initial search process may be stored in the memory 110, and used in later operations.

Meanwhile, a plurality of projection areas may be included for a specific space. For example, in an environment having spaces such as a living room, a room 1, a room 2, and a room 3, in case the living room has four projection areas, and the room 1 has two projection areas, the memory

110 may store information on each projection area (e.g., information on the location wherein the electronic apparatus 100 should be located for using the projection area, information on the projection direction in the location, etc.). More detailed explanation in this regard will be described in FIG. 13.

The display 120 may display an image. Meanwhile, the display 120 according to the disclosure may be a projector type in a form of projecting an image. For example, the projector type display may project an image on a projection area by using a light source such as a lamp and LEDs. For example, the display 120 may project a light corresponding to an image through a mirror, a lens, etc. The light projected as such may form a phase on the projection area.

In the case of using such a projector type, there is an advantage that a screen of a large size can be provided to the user by using a small body. That is, there is an effect that an image of a relatively big screen can be provided to the user while the size of the electronic apparatus 100 is reduced. Meanwhile, in actual implementation, if the electronic apparatus 100 can be implemented to be relatively big, it may be a form of including a display such as an LCD, OLEDs, etc. Also, a form of including a display in a projector type and a display such as an LCD, OLEDs, etc. together is possible.

The sensor 130 may detect the ambient environment of the electronic apparatus 100. For example, the sensor 130 may include at least one of a camera, a time of flight (ToF) sensor, a LiDAR sensor, etc., and may generate information for searching the ambient space of the electronic apparatus 100, or identifying a user.

The moving device 140 is a component for moving the electronic apparatus 100. For this, the moving device 140 may include a motor, wheels, etc., and move the electronic apparatus 100 through a movement of the wheels.

Meanwhile, in case the aforementioned display 120 is constituted as a projection type projector, the moving device 140 may adjust the projection direction of the electronic apparatus 100. For example, the moving device 140 may adjust the direction that the display 120 faces by adjusting the body location of the electronic apparatus 100 as illustrated in FIG. 2, or adjust the projection form by adjusting the location of the lens or the mirror inside the display 120.

Here, the projection direction means a direction wherein an image in a projection form is projected, and it may also be referred to as the direction that the electronic apparatus 100 faces, the projection direction, display direction, etc. Hereinafter, for making explanation easy, it will be expressed that a projection direction is changed, but it may also be expressed that a projection area is changed. Here, change of a projection area means a case wherein the center point of the projection area is changed, but not a case wherein the screen size is changed while the center point of the projection area is maintained.

The processor 150 controls the overall operations of the electronic apparatus 100. Specifically, the processor 150 may be connected with each component of the electronic apparatus 100 (e.g., the memory 110, the display 120, the sensor 130, the moving device 140), and control the overall operations of the electronic apparatus 100.

The processor 150 may be implemented as a digital signal processor (DSP) processing digital signals, a microprocessor, and a time controller (TCON). However, the disclosure is not limited thereto, and the processor 150 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. Also, the at least one processor 150 may be implemented as a system on chip (SoC) having a processing algorithm stored therein or large scale integration (LSI), or implemented in the form of a field programmable gate array (FPGA). Further, the at least one processor 150 may perform various functions by executing computer executable instructions stored in the memory. Meanwhile, the at least one processor 150 may include a plurality of processors (e.g., a CPU+a GPU, a CPU+a DSP).

The processor 150 may identify the setting state of the Do Not Disturb mode for each of a plurality of users using the electronic apparatus 100. Specifically, the Do Not Disturb mode for each user as described above may be set through a voice command, or information set in a user terminal apparatus may be provided to the electronic apparatus 100 and used. Here, the setting state may simply consist of one step, i.e., a state regarding whether the Do Not Disturb mode is applied or not, or consist of a plurality of steps. Such an example will be described later in FIG. 22.

Also, if a predetermined event occurs, the processor 150 may perform an operation corresponding to the event to a user who did not set the Do Not Disturb mode. Here, the predetermined event may include a case wherein a notification does not need to be notified, a case wherein a calling of a specific user or an instruction for performing a specific function was input, etc.

For such an operation, if moving is needed, the processor 150 may control the moving device 140 to move to a location wherein a specific event will be performed. Here, the processor 150 may identify whether there is a user who set the Do Not Disturb mode on the moving route, and if a user who set the Do Not Disturb mode is recognized, the processor 150 may set a route of moving in a direction that is distanced from the user as much as a predetermined distance.

Meanwhile, in a situation wherein it is impossible to move while being distanced from the user who set the Do Not Disturb mode as much as the predetermined distance, if it is within the predetermined distance from the user while driving on a possible route, the processor 150 may control the moving device 140 to move by reducing the driving speed. Also, while setting the route as described above, in consideration of the gaze direction (or the gaze area) of the user who set the Do Not Disturb mode, the processor 150 may set a route that does not make the electronic apparatus 100 move in the gaze area of the user. Such an operation will be described in detail in FIGS. 7 to 9, 14, and 15.

If the electronic apparatus 100 is moved to the aforementioned location, the processor 150 may perform an operation corresponding to the event. Here, the predetermined event may be an operation of outputting a notification as a sound, an operation of displaying an image, etc.

In such a case, if it is identified that the user who set the Do Not Disturb mode is near, the processor 150 may perform the aforementioned operation in a form of not influencing the user who set the Do Not Disturb mode. That is, if the user who set the Do Not Disturb mode is near, the processor 150 may perform the aforementioned event in the Do Not Disturb mode. For example, the processor 150 may output a sound and/or an image in a form of outputting a sound in a volume lower than the previous volume, or displaying an image in an area that avoided the gaze area of the user who set the Do Not Disturb mode.

As described above, the electronic apparatus 100 according to the disclosure manages the Do Not Disturb mode for each user, and thus the electronic apparatus 100 may provide a service to other users who did not set the Do Not Disturb mode. Also, if a user who set the Do Not Disturb mode near the electronic apparatus 100 is identified while providing the service as described above, the electronic apparatus 100 adjusts the volume or the location of an image such that influence on the user is minimized, and thus provision of a service that can satisfy each of a plurality of users is possible.

Meanwhile, in FIG. 3, only simple components of the electronic apparatus 100 were illustrated and explained, but in actual implementation, components that were not illustrated may be additionally used. Explanation in this regard will be described below with reference to FIG. 4.

Figure 4:
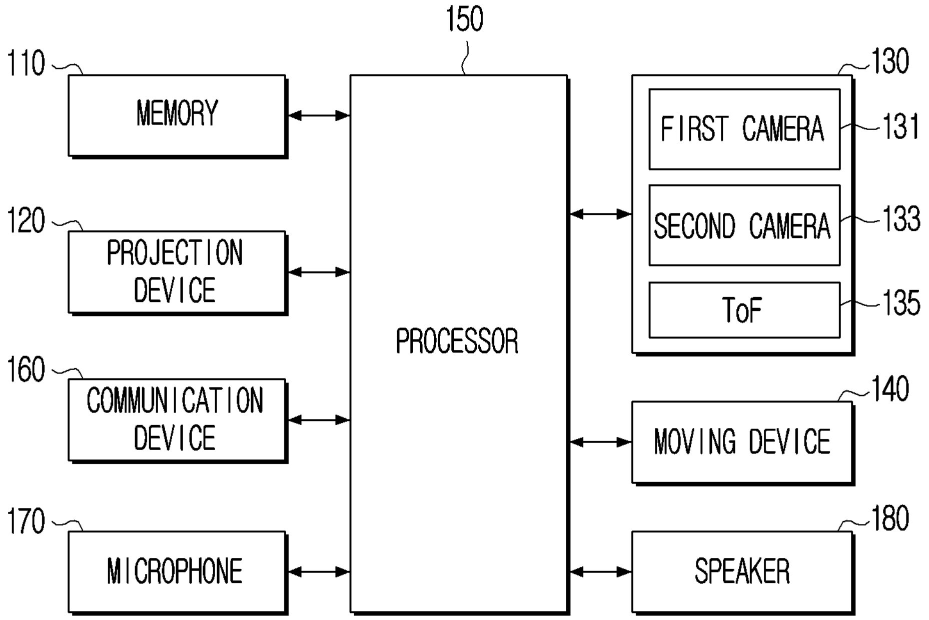
FIG. 4 is a block diagram for illustrating a configuration of an electronic apparatus according to an embodiment of the disclosure.

FIG. 4 is a block diagram for illustrating a configuration of an electronic apparatus according to an embodiment of the disclosure.

Referring to FIG. 4, the electronic apparatus 100 may include memory 110, a display 120, a sensor 130, a moving device 140, a processor 150, a communication device 160, a microphone 170, and a speaker 180.

As the memory 110, the display 120, the sensor 130, the moving device 140, and the processor 150 were explained above in FIG. 3, hereinafter, explanation regarding the same operations will be omitted, and only added operations will be explained.

The sensor 130 is a sensor for recognizing at least one of the ambient environment or a user of the electronic apparatus 100. For example, the sensor 130 may include a first camera 131, a second camera 133, and a ToF sensor 135.

The first camera 131 may be located on the front surface of the electronic apparatus 100, and photograph an image for an area located on the front side of the electronic apparatus 100. Here, the first camera 131 may be arranged to be adjacent to the display 120, and photograph the same direction as the projection direction.

Accordingly, an image photographed at the first camera 131 may be used in identifying whether the display 120 is normally projecting on a projection area, or in determining a projection area.

Also, an image photographed at the first camera 131 may be used in identifying a user. For example, the image may be used for recognizing a speaker who input a voice command or a user who set the Do Not Disturb mode. Accordingly, the processor 150 may identify a speaker who spoke, or identify a user who set the Do Not Disturb mode or the location of the user, etc. by using an image photographed at the first camera 131.

Meanwhile, in case an identified user has set the Do Not Disturb mode, and the user approaches within the predetermined distance from the electronic apparatus 100, the processor 150 may control the display 120 such that information that the Do Not Disturb mode is set is displayed. If the user requests release of the Do Not Disturb mode after such displaying, the processor 150 may release setting of the Do Not Disturb mode for the user. The aforementioned request may be input as a voice command, and may be performed through an interaction of the electronic apparatus 100.

Also, an image photographed at the first camera 131 may be used in identifying a state of a user. For example, in case a user is sleeping on a sofa or a bed, generation of a notification, etc. may cause inconvenience to the user. Accordingly, if it is identified that a user is sleeping based on an image photographed at the first camera 131, the processor 150 may set the Do Not Disturb mode for the user who is sleeping. As such a setting was not performed by the request of the user, if it is identified that the user woke up afterwards, the processor 150 may release the Do Not Disturb mode for the user.

Meanwhile, setting and release of the Do Not Disturb mode by sleeping described above may also be performed through photographing of an image, and may be based on information on a user's life pattern. For example, the processor 150 may store information on a user's sleeping pattern, and if the current hour is the user's sleeping hour, the processor 150 may set the Do Not Disturb mode. Meanwhile, in actual implementation, the processor 150 may directly set the Do Not Disturb mode according to the aforementioned pattern, or if the aforementioned pattern is identified, the processor 150 may directly display a message notifying that the user may set the Do Not Disturb mode in the pattern or make such a message displayed on the user terminal apparatus, or set the Do Not Disturb according to the user's request.

Also, an image photographed at the first camera 131 may be used in detecting a location or a movement of an object (or a person) in a projection area. For example, in case the display 120 is implemented in a projector form, as a light emitted by the projector is a quite high amount of light, in case a user directly faces the projected light, it may influence the user's eyesight.

Accordingly, the processor 150 may detect whether a person is located in a projection area wherein an image is projected based on an image photographed at the first camera 131 or an image or a sensor value input from an additional sensor (e.g., a PIR sensor). If a person is detected in the projection area, the processor 150 may control the display 120 such that the projection operation is stopped.

The second camera 133 may be located on the rear surface of the electronic apparatus 100, and photograph an image for an area located on the rear surface of the electronic apparatus 100. Here, the second camera 133 is located on the opposite surface of the projection area of the display 120, and thus it may photograph a user viewing the image.

Accordingly, an image photographed at the second camera 133 may be used in analyzing a user's posture and a user's gaze. Accordingly, the processor 150 may identify the state of the user using the electronic apparatus 100 by using the image photographed at the second camera 133. Alternatively, the processor 150 may identify whether another user exists other than the user by using the image photographed at the second camera 133. Meanwhile, in case a user who was additionally identified is a user who set the Do Not Disturb mode, the processor 150 may perform a specific operation in the Do Not Disturb mode, or perform an operation of releasing the Do Not Disturb mode of the user who was additionally detected.

Also, an image photographed at the second camera 133 may be used in identifying whether a person such as a user, etc. is approaching an area wherein an image is displayed. For example, the processor 150 may identify whether there is a person's approach to the front side (e.g., the projection area) of the electronic apparatus 100 by using an image photographed through the second camera 133. If such an approach is identified, the processor 150 may activate a danger detecting operation (i.e., an operation of detecting a location or a movement of an object (or a person) in a projection area).

In addition, an image photographed at the first camera 131 or an image photographed at the second camera 133 may be used in detecting a user's gesture. For example, the electronic apparatus 100 may receive input of not only a voice command method such as a user voice, etc., but also a control command through a user's gesture. In this case, the processor 150 may identify the user's gesture by using an image photographed at the first camera 131 or the second camera 133, and perform an event corresponding to the identified gesture.

The ToF sensor 135 is a three-dimensional sensor, and is a sensor that recognizes a sense of dimension or space information of an object by calculating a distance that a light emitted to an object returns after being reflected as time through an infrared (IR) wavelength. By using such a ToF sensor, a distance between a wall surface and a bottom surface, etc. can be identified more correctly. In such a ToF sensor 135, an output signal may be used in determining a projection area. Meanwhile, the processor 150 may determine a projection area by using the first camera 131 and a signal value (or an image) provided from the ToF sensor 135 in combination.

Meanwhile, in the illustrated example, it was illustrated that a plurality of cameras are included, but in actual implementation, only one camera may be included, and the ToF sensor may also be omitted. Also, other than the camera and the ToF sensor described above, a distance sensor (e.g., a Radio Detection and Ranging (Radar), a Light Detection and Ranging (LiDAR), an IR sensor, an ultrasonic sensor, etc.), a depth camera, a geomagnetic sensor, a fall detection sensor, a gyro sensor for detecting angular velocity, an encoder for identifying a moving speed, etc. may be included.

The communication device 160 is a component that performs communication with various types of external apparatuses according to various types of communication methods. The communication device 160 may include a Wi-Fi module, a Bluetooth module, an infrared communication module, an ultra wideband (UWB) module, and a wireless communication module, etc. Here, each communication module may be implemented in a form of at least one hardware chip.

A Wi-Fi module and a Bluetooth module perform communication by a Wi-Fi method and a Bluetooth method, respectively. In the case of using a Wi-Fi module or a Bluetooth module, various types of connection information such as a service set identifier (SSID) and a session key, etc. is transmitted and received first, and connection of communication is performed by using the information, and various types of information can be transmitted and received thereafter.

An infrared communication module performs communication according to an infrared Data Association (IrDA) technology of transmitting data to a near field wirelessly by using infrared rays between visible rays and millimeter waves.

An ultra-wideband (UWB) module is a module that supports wireless communication of transmitting information of large capacity at low power across a very wide bandwidth compared to a conventional spectrum.

A wireless communication module may include at least one communication chip that performs communication according to various wireless communication standards such as Zigbee, 3rd Generation (3G), 3rd Generation Partnership Project (3GPP), Long Term Evolution (LTE), LTE Advanced (LTE-A), 4th Generation (4G), 5th Generation (5G), etc., other than the aforementioned communication methods.

According to an embodiment, the communication device 160 may use the same communication module (e.g., a Wi-Fi module) for communicating with a user terminal apparatus or another electronic apparatus. Also, the processor 150 may calculate a distance from a user terminal apparatus of a specific user by using the communication device 160. For example, the communication device 160 may perform communication with a user terminal apparatus by using a peer-to-peer (P2P) communication method, etc., and calculate a distance between the user terminal apparatus and the communication device (i.e., the electronic apparatus) by using the signal strength, etc. in the communication process. Also, the processor 150 may receive apparatus information of the user terminal apparatus (or information necessary for identifying the user of the user terminal apparatus), and identify the user of the user terminal apparatus. Through such a process, if the user of the user terminal apparatus is a user who set the Do Not Disturb mode, and the distance from the user terminal apparatus is within the predetermined distance, the processor 150 may operate in the Do Not Disturb mode.

In the aforementioned process, it was illustrated and explained that a user is identified through an image photographed through the camera, etc., but in actual implementation, it is also possible to recognize a user by identifying a distance through communication with the user terminal apparatus of the user.

Meanwhile, for identifying a distance from a user terminal apparatus more precisely, the electronic apparatus 100 may use another electronic apparatus. For example, the electronic apparatus 100 may recognize a location of a user by being provided with information on the distance from a user terminal apparatus from another electronic apparatus distanced from the electronic apparatus 100, and summing up the information on the distance from the user terminal apparatus identified in the current apparatus (i.e., by using a triangulation method) by the processor 150. Also, the electronic apparatus 100 may identify a correct location of a user terminal apparatus not by measuring the distance from the user terminal apparatus in one place, but by measuring the distance from the user terminal apparatus in a plurality of locations, i.e., by measuring the distance from the user terminal apparatus in a first location, and then moving to a second location and measuring the distance from the user terminal apparatus again.

The communication device 160 may receive information on the setting state of the Do Not Disturb mode for each user from the server. Alternatively, the communication device 160 may receive information on the setting state of the Do Not Disturb mode of each user from each user. For example, setting of the Do Not Disturb mode of users may be managed comprehensively by a separate server, etc. individually for each user terminal apparatus. In case a separate server is not used, the communication device 160 may receive setting information for the Do Not Disturb mode for a user of a user terminal apparatus from the user terminal apparatus. In contrast, in case the aforementioned information is managed at a server, the communication device 160 may receive integrated information for a plurality of users from the server (or a home server, etc.).

Here, the setting state may consist of whether the Do Not Disturb mode should operate or not for each user. Alternatively, the setting state may include whether the Do Not Disturb mode will be applied for each of a plurality of notification types (or notification forms), or applying steps of the Do Not Disturb mode. For example, if a notification using a sound method is inconvenient to a user, but the user can accept a notification using a visual method (e.g., displaying a message in an image), the Do Not Disturb mode may be applied to a notification by a sound method, but the Do Not Disturb mode may not be applied to a notification by a message method. Alternatively, there may be various types of notifications, and application in a form wherein the Do Not Disturb mode is applied only to a specific notification among notifications, and the Do Not Disturb mode is not applied to other notifications is also possible.

The communication device 160 may receive a map. For example, the communication device 160 may receive a map for the space wherein the electronic apparatus 100 is located through a robot cleaner or a home server, etc.

Specifically, in the above, it was explained that the electronic apparatus 100 operates in the Do Not Disturb mode based on a distance from a user who set the Do Not Disturb mode. Specifically, it was explained that, if a distance from a user who set the Do Not Disturb mode is within a specific distance, the electronic apparatus 100 operates in the Do Not Disturb mode. However, in actual implementation, the aforementioned operation may be performed in space units but not a specific distance. For example, the disclosure may be implemented such that, in a space having a room 1, a room 2, a room 3, etc., if a user who set the Do Not Disturb mode is located in the room 3, the electronic apparatus 100 operates in the Do Not Disturb mode only in the room 3, and does not operate in the Do Not Disturb mode in the other spaces.

Meanwhile, in actual implementation, the disclosure may be used by applying room units and distances in combination. For example, if there is no big difference in distances among rooms, and even if the Do Not Disturb mode was set for the room 3, if a high sound is output in front of the room 3, interference may be caused to a user who set the Do Not Disturb mode. Accordingly, the processor 150 may consider all of a space wherein a user who set the Do Not Disturb mode is located, a space wherein the electronic apparatus is located, and a distance between the user and the electronic apparatus, and determine whether the electronic apparatus 100 will operate in the Do Not Disturb mode when performing an operation corresponding to a request of another user who did not set the Do Not Disturb mode.

Also, when applying distinction of spaces as described above, the processor 150 may consider a state of a space wherein a user who set the Do Not Disturb mode is located. For example, according to a state wherein a room door of a specific space is opened and a state wherein the room door is closed, a state wherein a sound outside the space is transmitted to the specific space may vary. Accordingly, the processor 150 may adjust an application state of the Do Not Disturb mode by considering a space wherein a user who set the Do Not Disturb mode is located and the characteristics of the space, etc. Here, the characteristics of the space may include opened/closed states of the room door of the space, the size of the space, etc., as described above.

Also, the communication device 160 may receive a content. The processor 150 may control the communication device 160 to receive a content based on a user's instruction for reproducing a content. When a content is received, the processor 150 may control the display 120 such that an image corresponding to the received content is displayed, and control the speaker 180 such that a voice corresponding to the received content is output.

In addition, the communication device 160 may receive event information. For example, if event information notifying that an outsider visitor came is received from the home server, the processor 150 may determine a user to whom the event will be notified based on the received event information. For example, in case it is recognized that a user 1, a user 2, and a user 3 are located in the current space, and the user 1 set the Do Not Disturb mode, the processor 150 may determine that the notification will be notified to the user 2 or the user 3. Here, in case there are priorities regarding reception of a notification for each user, the electronic apparatus 100 may determine a user to whom the notification will be notified based on the priorities.

Further, the communication device 160 may transmit information on the Do Not Disturb mode. For example, in case a specific user set the Do Not Disturb mode, the processor 150 may control the communication device 160 such that information on the setting state of the Do Not Disturb mode is notified to the user terminal apparatuses of the other users, for notifying to the other users that the Do Not Disturb mode was set for the user. Alternatively, the processor 150 may control the communication device 160 such that the information is transmitted to the home server managing the state regarding the Do Not Disturb mode of the users.

The microphone 170 may receive a user's voice in an activated state. For example, the microphone 170 may be formed as an integrated type in the upper side or the front surface direction, the side surface direction, etc. of the electronic apparatus 100. The microphone 170 may include various components such as a microphone collecting a user voice in an analogue form, an amp circuit amplifying the collected user voice, an A/D conversion circuit that samples the amplified user voice and converts the user voice into a digital signal, a filter circuit that removes noise components from the converted digital signal, etc.

When a user voice is input through such a microphone 170, the processor 150 may identify the content of the user's voice, and perform an operation corresponding to the voice content.

For example, if a user utters a command calling the electronic apparatus 100, the processor 150 may recognize the call command by using the voice command input through the microphone 170. Here, the processor 150 may recognize the utterance location identified through the microphone 170, or recognize the location of the user or the user by using an image photographed at the sensor 130, etc., and control the moving device 140 such that the electronic apparatus 100 moves to an ambient location of the user who called.

If a user utters a voice requesting an utterance prohibition command, the processor 150 may identify the user's utterance intent by using the voice command input through the microphone 170, and identify the speaker through analysis of the characteristics of the voice (or the user's face in an image photographed through the camera, etc.), and set the utterance prohibition mode for the identified speaker. Also, in contrast, in case a user uttered a voice releasing the setting of the utterance prohibition mode, the processor 150 may identify the speaker, and release the setting of the utterance prohibition mode for the speaker.

Meanwhile, in actual implementation, a user may set not only his/her utterance prohibition mode, but also an utterance prohibition mode for another user. For example, a parent taking care of a child may set an utterance prohibition mode for the child. In this case, the processor 150 may set the utterance prohibition mode for a subject in voice recognition, through voice recognition for an uttered voice. Also, in contrast, the processor 150 may release the utterance prohibition mode for a specific subject based on a result in voice recognition.

The speaker 180 may output a sound. Specifically, the speaker 180 may be a component that outputs not only various types of audio data corresponding to a content, but also various types of notification sounds or voice messages, etc. Also, the speaker 180 may output result information corresponding to a voice recognition operation that will be described below.

Meanwhile, in an output process of a notification as described above, if a user who set the Do Not Disturb mode is identified in the surroundings, the processor 150 may reduce the output volume of the notification as described above. Here, the processor 150 may identify the distance from the user who set the Do Not Disturb mode, and determine a volume corresponding to the identified distance, and output a sound in the determined output volume.

Meanwhile, if it is difficult for a user who will view the notification to recognize the notification with the determined output volume, the processor 150 may control the display 120 to display visual information corresponding to the notification. Here, the processor 150 may control the display 120 to display information that the volume was reduced as the user who set the Do Not Disturb mode is located near in the surroundings, etc. Here, the visual information may be a text corresponding to a notification voice, and if an image is being reproduced, it may be the subtitle of the image.

In the above, it was illustrated and explained that, in case the Do Not Disturb mode was set for a specific user, a notification, etc., were not notified to the user. Meanwhile, types of notifications may be divided into a plurality of steps, and the aforementioned operation may be applied only to general notifications, and in situations related to emergencies such as occurrence of earthquake, occurrence of fire, etc., the electronic apparatus 100 may operate regardless of the aforementioned Do Not Disturb mode.

Meanwhile, in FIG. 4, an electronic apparatus including various additional components was illustrated, but an electronic apparatus may be implemented in a form wherein some components among the illustrated components are omitted. Also, although not illustrated in the drawing, an electronic apparatus may further include other components (e.g., a vacuum cleaner sucking up dust, etc.).

Figure 5:
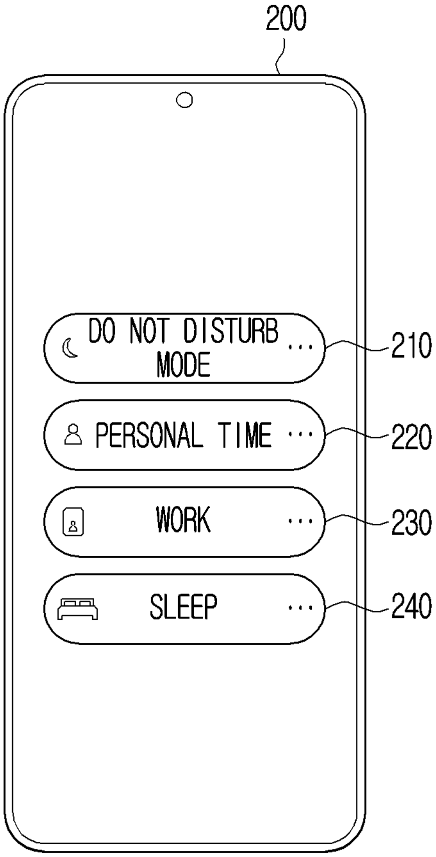
FIG. 5 is a diagram illustrating an example of a user interface window for setting of a Do Not Disturb mode according to an embodiment of the disclosure.

FIG. 5 is a diagram illustrating an example of a user interface window for setting of a Do Not Disturb mode according to an embodiment of the disclosure.

Referring to FIG. 5, a user interface window 200 may include selection areas 210, 220, 230, 240 that a user can select.

The first selection area 210 is a selection area for setting of the Do Not Disturb mode. A user may select the first selection area 210, and information that the user set the Do Not Disturb mode may be provided to the electronic apparatus 100 (or a home server). Meanwhile, in actual implementation, a user may set an ending point of the Do Not Disturb mode through a window for receiving setting of an ending point of the Do Not Disturb mode after selecting the first selection area 210.

The second selection area 220 is a selection area for the setting that a user is currently spending a personal time. If the second selection area 220 is selected, information that the user set the personal time mode may be provided to the electronic apparatus 100 (or a home server). Meanwhile, if the second selection area 220 is selected after the state wherein the user set the Do Not Disturb mode, the Do Not Disturb mode may be released.

The third selection area 230 is a selection area for the setting that a user is currently spending a work time. An operation in the third selection area 230 may be similar to that in the second selection area 220. Meanwhile, in case a user sets or uses a work time as an example of the Do Not Disturb mode, if the third selection area 230 is selected, information that the user set the Do Not Disturb mode may be provided to the electronic apparatus 100 (or a home server).

The fourth selection area 240 is a selection area for the setting that a user is spending a sleeping time. If the fourth selection area 240 is selected, the user terminal apparatus may transmit information notifying that the Do Not Disturb mode was set for the electronic apparatus 100 to the electronic apparatus 100 (or a home server).

Meanwhile, in the above, a user interface window wherein various selections are made based on a user's behaviors was illustrated, but in actual implementation, a screen only for the setting of the Do Not Disturb mode may be displayed. Explanation in this regard will be described later in FIGS. 19 and 22.

Meanwhile, in the above, it was illustrated and explained that a Do Not Disturb mode of a user is independently set in the electronic apparatus 100, but operations such as setting of a Do Not Disturb mode, etc. may operate by being interlocked with a user terminal apparatus.

For example, even in case a user did not set a separate Do Not Disturb mode for the electronic apparatus 100, i.e., in case a user set a Do Not Disturb mode for his/her user terminal apparatus, information regarding the setting may be provided to the electronic apparatus 100, and a Do Not Disturb mode may be set in the electronic apparatus 100 by being interlocked with the aforementioned setting operation, even though the user did not set a separate Do Not Disturb mode for the electronic apparatus 100.

Figure 6:
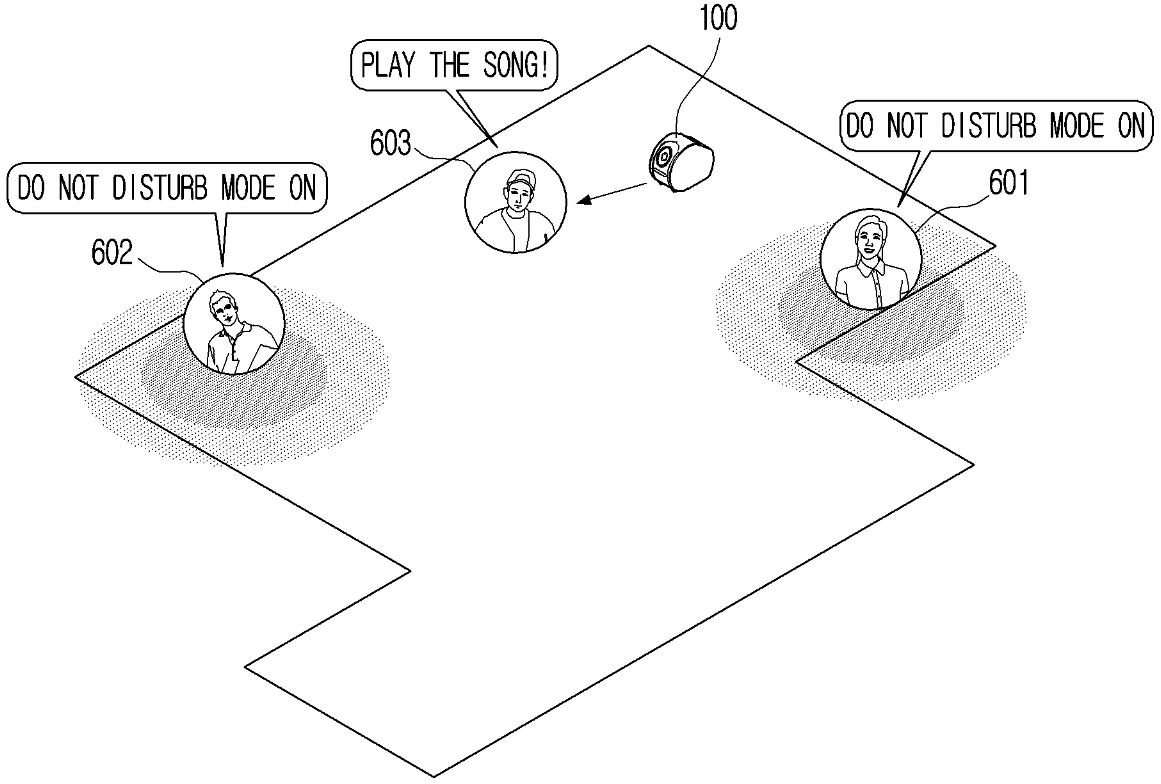
FIG. 6 is a diagram illustrating an operation of an electronic apparatus in case some users among a plurality of users set a Do Not Disturb mode according to an embodiment of the disclosure.

FIG. 6 is a diagram illustrating an operation of an electronic apparatus in case some users among a plurality of users set a Do Not Disturb mode according to an embodiment of the disclosure.

Referring to FIG. 6, a map is illustrated for the space wherein the electronic apparatus 100 is located. In the illustrated example, three users 601, 602, 603 are located in the space.

In such an environment, it is assumed that the first user 601 and the second user 602 set the Do Not Disturb mode. For example, the first user may have set the Do Not Disturb mode as he/she was reading a book, and the second user may have set the Do Not Disturb mode as he/she was working.

Such a Do Not Disturb mode may have been input by each user through a voice command to the electronic apparatus 100, and as explained in FIG. 5, the Do Not Disturb mode may have been set in the user terminal apparatuses of each user.

In case an electronic apparatus is used by a plurality of users together as above, the activity states of each user may be diverse. That is, in case some users (e.g., the first user) set the Do Not Disturb mode, but the third user cannot use the electronic apparatus 100, inconvenience due to this may occur.

In this aspect, it is possible to set a Do Not Disturb mode for each user in the disclosure, and accordingly, even if a specific user set a Do Not Disturb mode, another user who did not set a Do Not Disturb mode can use the electronic apparatus 100.

In such an environment, the third user 603 may call the electronic apparatus 100, and utter a voice command requesting to play a song. The electronic apparatus 100 may move near the third user 603 in response to the call of the third user 603. Then, the electronic apparatus 100 may perform reproduction of music in response to the request of the third user 603.

Meanwhile, if the location to which the electronic apparatus 100 moved for reproduction of music is distanced a lot from the first user 601 and the second user 602, and it is thus determined that the music currently being output does not influence the first user 601 and the second user 602, the electronic apparatus 100 may output the music in the volume requested by the third user 603 (or a predetermined volume).

However, if the distance between the electronic apparatus 100 and the first user 601 or the distance between the electronic apparatus 100 and the second user 602 is within the predetermined distance, the electronic apparatus 100 may output the music in a volume in which the output sound is not heard by the first user 601 or the second user 602.

Here, the electronic apparatus 100 may provide a guide message that, as there is a user who set the Do Not Disturb mode in a near place, the music is output by reducing the volume to the third user 603. Such a guide message may be output as a sound, or output as visual information (i.e., a message).

Meanwhile, if a call of a new user is generated while the electronic apparatus 100 is performing an operation according to a request of the third user, the electronic apparatus 100 may determine whether to perform the request.

For example, in case a new fourth user who was not illustrated uttered a voice command which is "Show me a cooking recipe!", if the operation according to the request of the third user has been currently stopped, the electronic apparatus 100 may move to the surroundings of the fourth user.

However, if a request of a new user is generated while the operation according to the request of the third user has not been stopped, the electronic apparatus 100 may determine whether to perform an operation according to the new request.

For example, the electronic apparatus 100 may identify a user who made a new request, and identify whether the identified user has a higher priority for the use of the electronic apparatus 100 than the third user. If the priority of the fourth user is higher, the electronic apparatus 100 may provide a notification message that reproduction of music is stopped as a call of the fourth user was generated to the third user, and move to the surroundings of the fourth user.

If priorities are not set separately, or the users have the same priority, the electronic apparatus 100 may guide to the third user that there was a call from the fourth user, and inquire if the current work can be stopped, and determine whether to move according to whether the third user allows it.

In this case, the electronic apparatus 100 may identify whether there is an apparatus that can do the current work instead, and in case there is another apparatus that can perform the operation corresponding to the request of the third user as a result of identification, the electronic apparatus 100 may make the request performed in the another apparatus. For example, in case a TV, a speaker, etc. that can output a sound exist around the third user 603, the electronic apparatus 100 may perform control such that the apparatus (e.g., a speaker) continues to output the music that is being reproduced in the electronic apparatus 100.

Meanwhile, in case the third user prohibited moving, the electronic apparatus 100 may transmit a notification message notifying that it cannot move as the third user is currently using it to the user terminal apparatus of the fourth user.

Meanwhile, in the above, it was illustrated and explained that the electronic apparatus 100 directly moves to the surroundings of a user according to a request of the user and performs a corresponding operation, but the electronic apparatus 100 may not directly perform a specific operation in response to a request of a user, but perform an event corresponding to the request of the user by controlling another electronic apparatus.

For example, in case a request of the third user is reproduction of music, the electronic apparatus 100 may control a speaker device located near the third user to output the music. Alternatively, in case the electronic apparatus 100 was directly outputting music by a request of the third user, and a request of the fourth user is generated, the electronic apparatus 100 may make an ambient speaker device to perform the output.

Also, in case the electronic apparatus 100 does not have to directly move and proceed with a work requested by the fourth user, the electronic apparatus 100 may proceed with the request of the fourth user while maintaining the current location. For example, in case a display device exists around the fourth user, the electronic apparatus 100 may search a recipe according to the request of the fourth user, and make the search result displayed on the display device.

Figure 7:
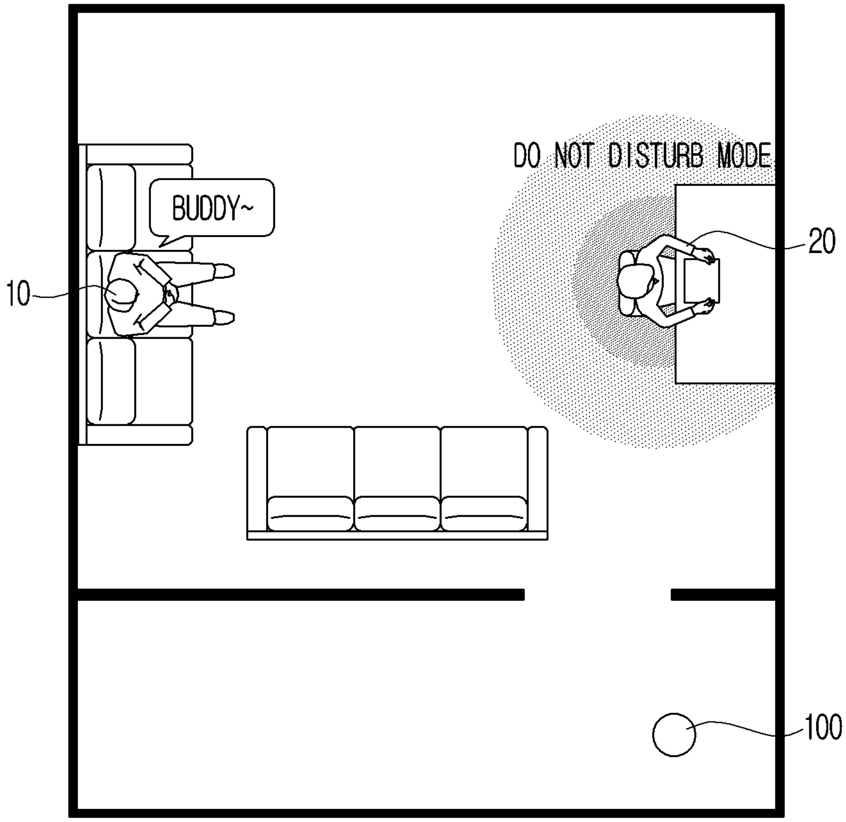
FIG. 7 is a diagram for illustrating a moving operation of an electronic apparatus in case some users among a plurality of users set a Do Not Disturb mode according to an embodiment of the disclosure.

FIG. 7 is a diagram for illustrating a moving operation of an electronic apparatus in case some users among a plurality of users set a Do Not Disturb mode according to an embodiment of the disclosure.

Referring to FIG. 7, a plurality of users 10, 20 are located in a specific space. Hereinafter, explanation will be described by assuming that the first user 10 is a user who did not set a Do Not Disturb mode, and the second user 20 is a user who set a Do Not Disturb mode.

In such an environment, the first user 10 may utter a voice command calling the electronic apparatus 100. If a voice command calling the electronic apparatus 100 is input through the microphone, the electronic apparatus 100 may identify who the speaker of the input voice command is based on voice analysis for the voice input through the microphone or an image photographed by the camera. Here, in case the electronic apparatus 100 includes a plurality of microphones, the electronic apparatus 100 may assume the location of the speaker through analysis of the wavelength of the sound input through the plurality of microphones.

When the location of the speaker, etc. are assumed as described above, the electronic apparatus 100 may perform moving to the assumed location. A specific operation of determining a moving direction will be explained below with reference to FIGS. 8 and 9.

Figure 8:
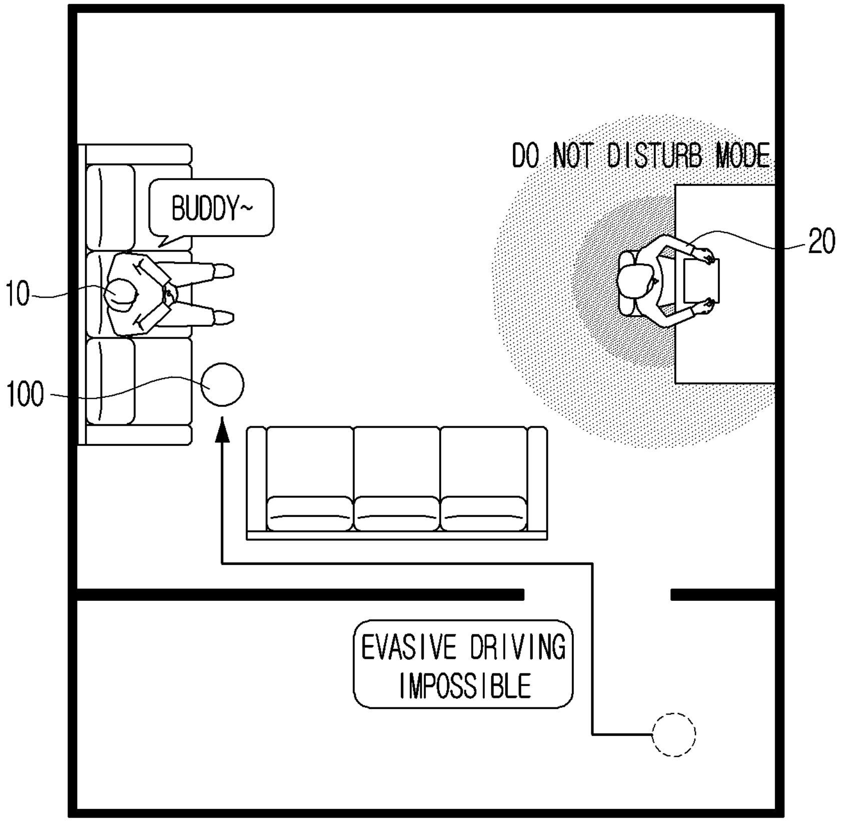
FIG. 8 is a diagram for illustrating a moving operation of an electronic apparatus in case some users among a plurality of users set a Do Not Disturb mode according to an embodiment of the disclosure.
Figure 9:
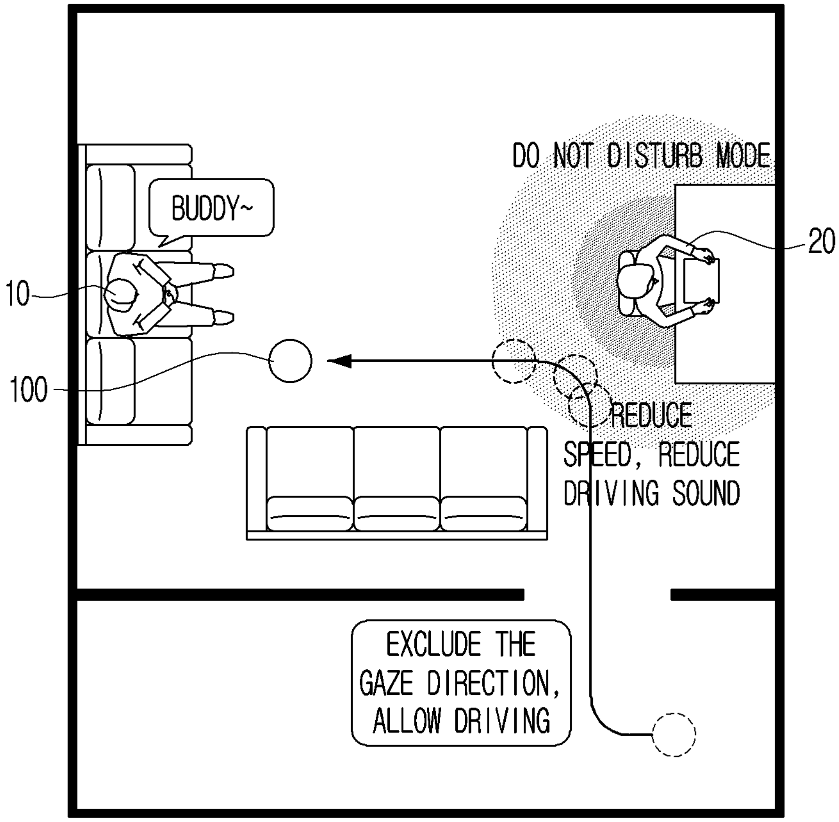
FIG. 9 is a diagram for illustrating a moving operation of an electronic apparatus in case some users among a plurality of users set a Do Not Disturb mode according to an embodiment of the disclosure.

FIGS. 8 and 9 are diagrams for illustrating a moving operation of an electronic apparatus in case some users among a plurality of users set a Do Not Disturb mode according to various embodiments of the disclosure.

As described above, in order that interference is not caused to a user who set a Do Not Disturb mode, the electronic apparatus 100 should move while maintaining a specific distance or more from the user who set the Do Not Disturb mode.

Referring to FIGS. 8 and 9, in case the electronic apparatus 100 cannot move while maintaining a specific distance or more from the user 20 who set a Do Not Disturb mode due to an obstacle, the electronic apparatus 100 may perform moving by using a route passing within a predetermined distance from the user 20 who set the Do Not Disturb mode.

Meanwhile, during the aforementioned moving, the electronic apparatus 100 may perform moving by a method of reducing the moving speed within the predetermined distance from the user, for minimizing noises according to moving.

Change of a speed may consist of three steps, and it may consist of, for example, high speed moving, low speed moving, and stopping. In this case, the electronic apparatus

100 may move by a method of moving at a high speed in a state wherein the user is distanced by the predetermined distance or more, and moving at a low speed within the predetermined distance, and moving at a high speed if the user is distanced by the predetermined distance or more again.

Also, the electronic apparatus 100 may perform the aforementioned operation in three or more steps but not two kinds of speed changes. For example, the aforementioned low speed moving may be divided into a plurality of steps, and the aforementioned predetermined distance may also be divided into a plurality of distances, and may have a form wherein the speed changes by stages according to the distance from a user who set the Do Not Disturb mode.

Figure 10:
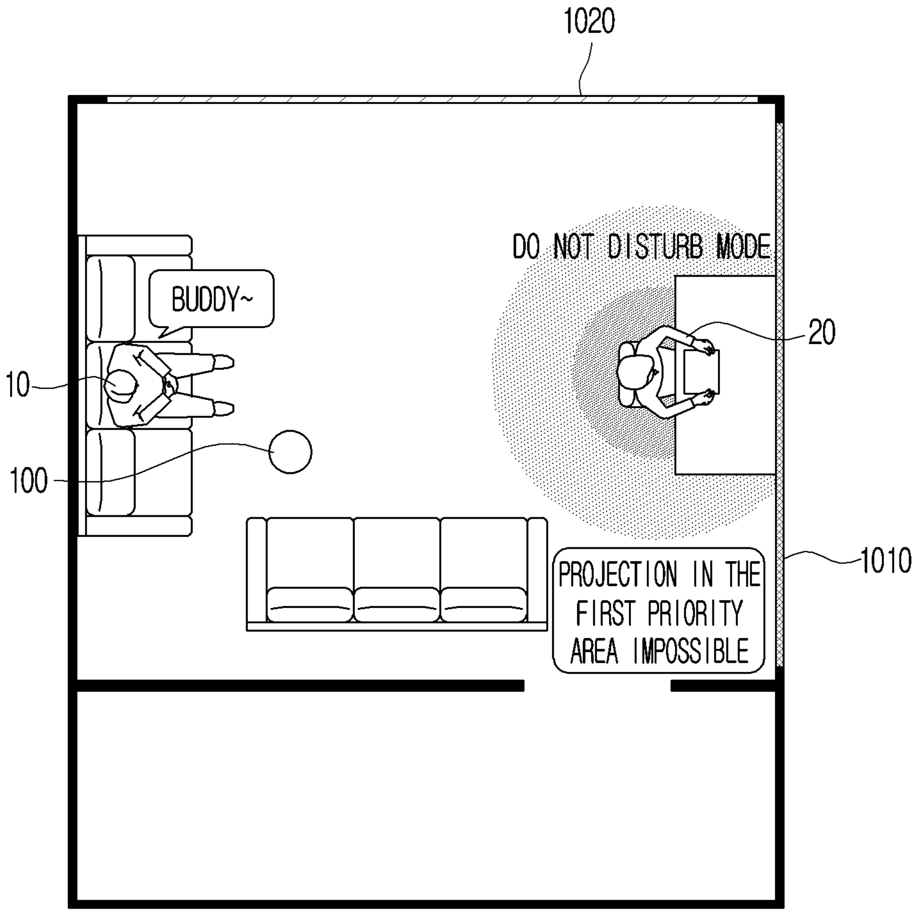
FIG. 10 is a diagram for illustrating a displaying operation of an electronic apparatus in case some users among a plurality of users set a Do Not Disturb mode according to an embodiment of the disclosure.

FIG. 10 is a diagram for illustrating a displaying operation of an electronic apparatus in case some users among a plurality of users set a Do Not Disturb mode according to an embodiment of the disclosure.

Referring to FIG. 10, the first user 10 may perform a voice command requesting output of an image.

For performing such an operation, the electronic apparatus 100 may search a space wherein an image will be projected. Such a projection area may have been obtained in advance as a plurality of areas, or a projection area may be searched on a time point when there is a request of a user and used.

Here, a projection area means an area wherein an image in a projection form is projected, and it may be referred to as a projection direction that the electronic apparatus 100 faces, a projection area, a display area, a screen area, etc.

For example, in case there are two areas wherein an image can be projected in the space wherein the electronic apparatus 100 is located (e.g., 1010, 1020), the electronic apparatus 100 may select an area that does not influence a user who set a Do Not Disturb mode from among the two areas, and project an image in the selected area.

In the illustrated example, a location good for viewing an image in the area wherein the first user 10 is located is the first area 1010. However, in case an image is displayed in the first area 1010, influence may be exerted on the second user 20. Accordingly, the electronic apparatus 100 may determine the second area 1020 that does not reach the gaze area of the second user among the plurality of areas as the area wherein an image will be displayed.

In this case, the electronic apparatus 100 may provide a message notifying that it is difficult to display an image on the front side of the first user 10 (i.e., the first area 1010). Meanwhile, in the above, it was illustrated and explained that an image is projected in another area that avoided the gaze of the second user 20, but as the second user 20 is in the Do Not Disturb mode, the electronic apparatus 100 may recommend image viewing in another space except the space.

Figure 11:
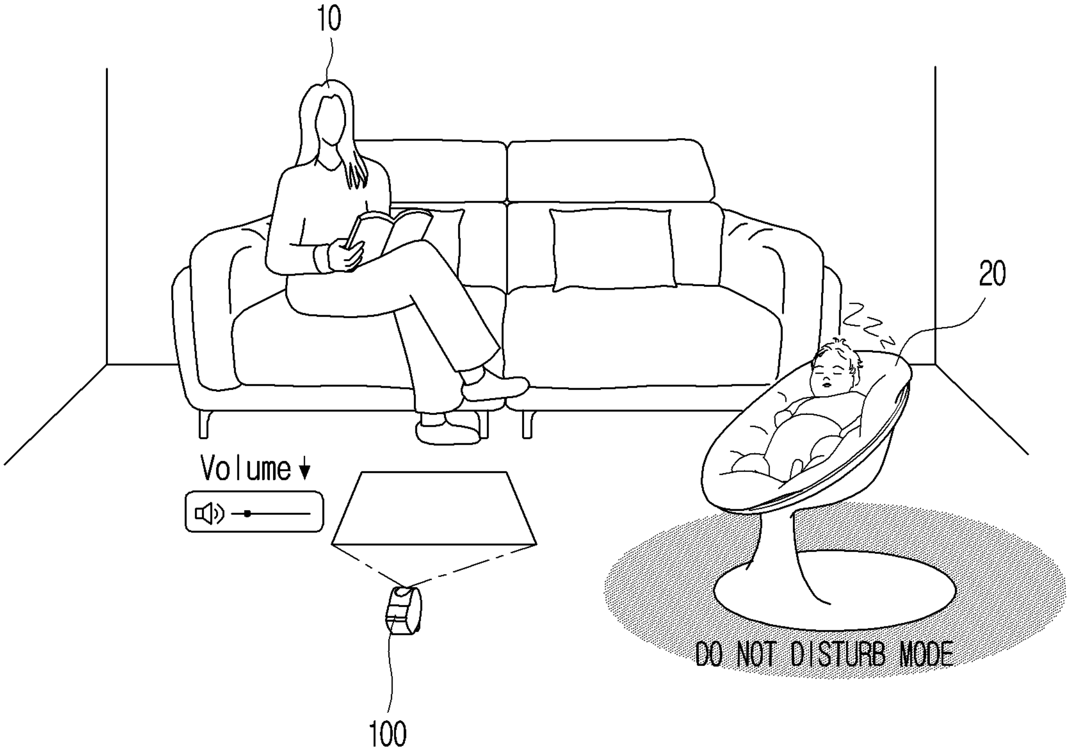
FIG. 11 is a diagram for illustrating a moving operation of an electronic apparatus in case some users among a plurality of users set a Do Not Disturb mode according to an embodiment of the disclosure.

FIG. 11 is a diagram for illustrating a moving operation of an electronic apparatus in case some users among a plurality of users set a Do Not Disturb mode according to an embodiment of the disclosure.

Referring to FIG. 11, a plurality of users 10, 20 are located in the surroundings of the electronic apparatus 100. The first user 10 may set a Do Not Disturb mode for another user 20 who is not himself/herself. Alternatively, the electronic apparatus 100 may identify the state of the user 20, and automatically set the Do Not Disturb mode based on the identified state.

In such an environment, if an event wherein a notification should be provided to the first user occurs, the electronic apparatus 100 may perform an operation of moving to the surroundings of the first user 10.

Here, in order not to influence the second user 20 who set the Do Not Disturb mode, the electronic apparatus 100 may approach the first user 10 by using a route distanced from the second user 20 as much as the predetermined distance. Also, in the case of having to move through the predetermined distance from the second user 20 inevitably, the electronic apparatus 100 may move by reducing the moving speed within the predetermined distance from the second user 20.

When the electronic apparatus 100 is located in the surroundings of the first user 10 through such an operation, the electronic apparatus 100 may output a notification message corresponding to the event that occurred as a sound or an image. Here, in consideration of the distance from the second user 20, the electronic apparatus 100 may output a sound while reducing the volume, or display a message in an area wherein the gaze of the second user 20 does not reach.

Meanwhile, in the above, it was illustrated and explained that the aforementioned operations are performed only for a person, but in actual implementation, the electronic apparatus 100 may perform the aforementioned operations for animals located in a space.

For example, in case a puppy is raised in a home, if the puppy is sleeping, an operation of moving while avoiding the puppy, etc. may be performed. Also, if an animal is identified on a moving route in a moving process, an operation of changing the moving route, or moving while reducing the moving speed may be performed.

Figure 12:
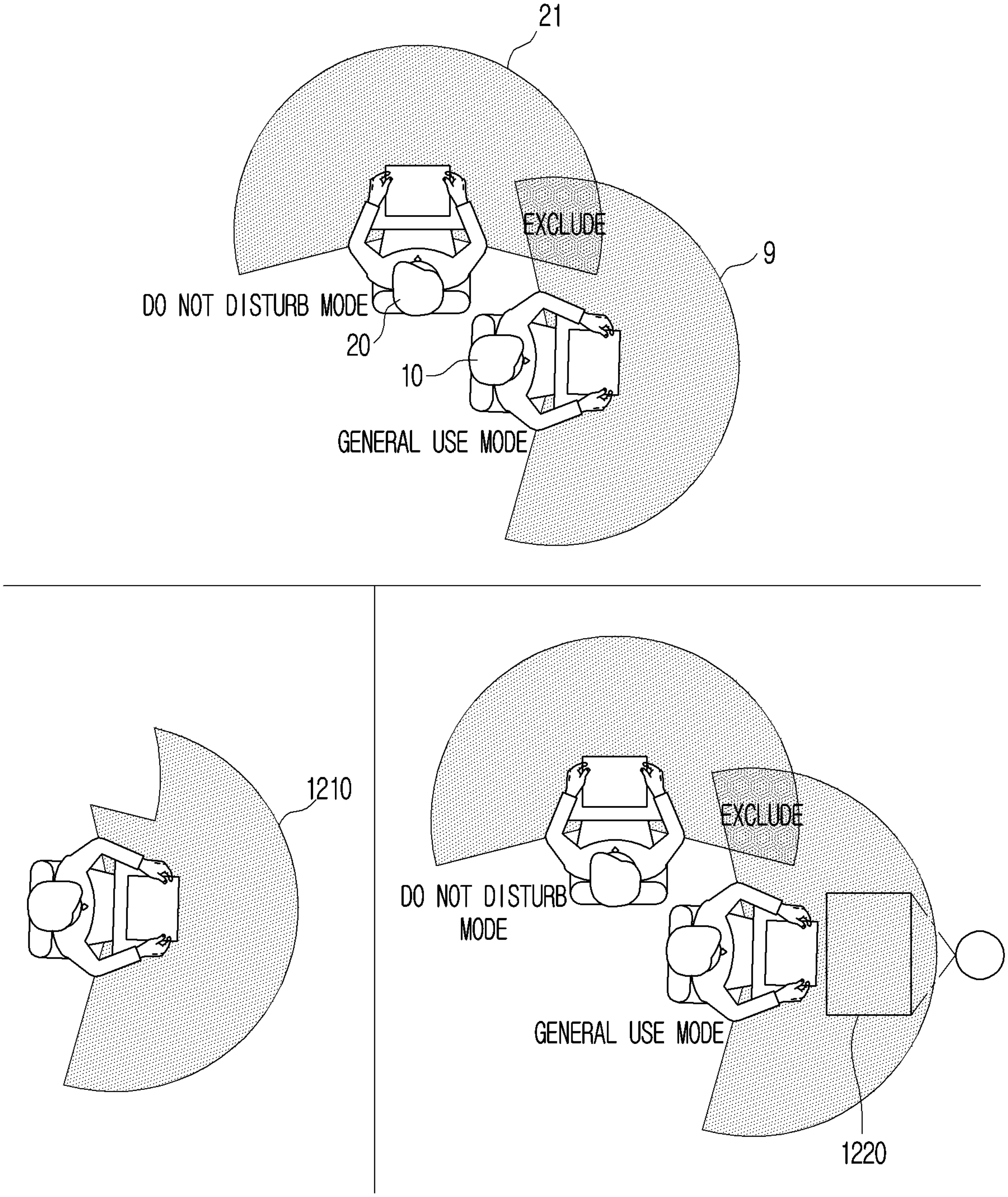
FIG. 12 is a diagram for illustrating a displaying operation of an electronic apparatus in case some users among a plurality of users set a Do Not Disturb mode according to an embodiment of the disclosure.

FIG. 12 is a diagram for illustrating a displaying operation of an electronic apparatus in case some users among a plurality of users set a Do Not Disturb mode according to an embodiment of the disclosure.

Referring to FIG. 12, a diagram for illustrating an image projection area in case the first user 10 who did not set a Do Not Disturb mode and the second user 20 who set a Do Not Disturb mode are located in the same space.

As illustrated in the drawing, the gaze areas 9, 21 of each user 10, 20 may have an angle of approximately 120 degrees based on the user's center.

Accordingly, if an image projected by the electronic apparatus 100 is located within the gaze area 21 of the second user 20, the second user 20 may be interfered by the image. Accordingly, if a request for image projection of the first user 10 is input, the electronic apparatus 100 may identify a gaze (or a posture) of each user, and identify a gaze area of each user.

For example, the electronic apparatus 100 may identify a gaze direction (or a head direction, a torso direction) of each user, and identify a gaze area in a fan shape that has a predetermined angle (e.g., 120 degrees) based on the identified gaze direction (or the head direction).

Then, the electronic apparatus 100 may project an image 1220 within a gaze area 1210 wherein only the first user 10 can view an image among the identified gaze areas. Meanwhile, in consideration of the gaze area 1210 wherein only the first user 10 can view an image and the gaze direction of the first user 10, etc., the electronic apparatus 100 may determine a location and a size appropriate for them, and display an image in the determined location and size.

Also, in consideration of not only an image displayed in projection of an image, but also a gray area around the image, the electronic apparatus 100 may make the gray area not included in the gaze of the second user 20.

Meanwhile, in the illustrated example, a case wherein gaze areas of two users are overlapped was assumed, but in case gaze areas of two users are not overlapped, an area wherein an image will be projected may be determined by further expanding the gaze range of the user 20 who set the Do Not Disturb mode.

For example, the aforementioned gaze direction is based on assumption of a case wherein a user faces the front side, but if the user rotates the neck (or the head), the gaze direction may be expanded. Accordingly, when determining the gaze direction (or the gaze area) of the second user, an area for projection may be determined in consideration of the rotation radius of the head (or the neck) of the second user. If the rotation radius of the head is considered, if there is no area for projection or an area for projection becomes very small, an area for projection may be determined in consideration of only the gaze area as described above.

Figure 13:
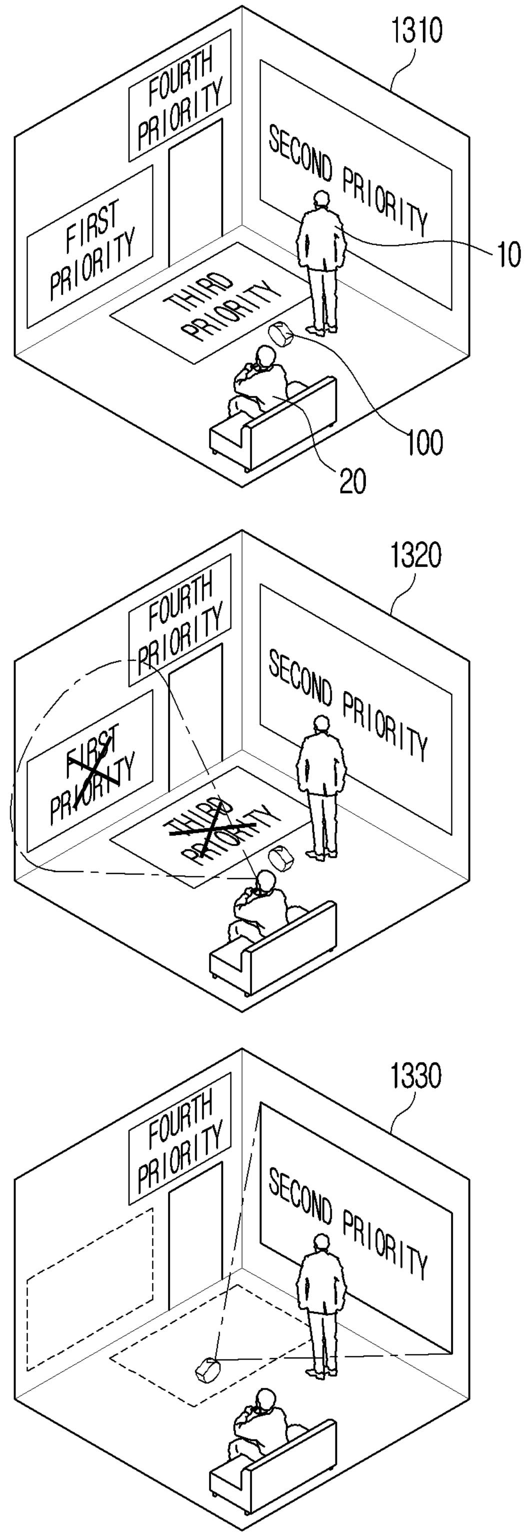
FIG. 13 is a diagram for illustrating a displaying operation of an electronic apparatus in case some users among a plurality of users set a Do Not Disturb mode according to an embodiment of the disclosure.

FIG. 13 is a diagram for illustrating a displaying operation of an electronic apparatus in case some users among a plurality of users set a Do Not Disturb mode according to an embodiment of the disclosure.

Referring to FIG. 13, the electronic apparatus 100 according to the disclosure can move, and may project an image by a projection method.

Meanwhile, for projecting an image in various heights or angles, the electronic apparatus 100 can adjust a projection direction of an image. For example, the electronic apparatus 100 may rotate the body wherein the projector (or the display) is arranged, and adjust an angle of a projected image through direction conversion of the body. For example, the electronic apparatus 100 may adjust a projection direction of the electronic apparatus 100 by various methods in forms such as adjusting a direction by adjusting the height of a suspension connecting the front wheel and the rear wheel of the body, or adjusting a display angle in the body, etc.

Also, the electronic apparatus 100 may adjust a display height or angle of an image by adjusting an angle of a lens or a mirror in the projector. Also, in implementation examples, adjustment of an angle is possible by combining two methods (e.g., an angle of the lens, a direction of the body).

In case an image can be projected in various angles and directions as above, the electronic apparatus 100 may project images in various areas inside a space.

For example, as illustrated in the drawing, the electronic apparatus 100 may obtain four projection areas inside a space. Acquisition of projection areas as above may be performed by scanning an ambient space based on a user's command for displaying an image, or space information generated according to a previous scanning operation may be used. For example, the electronic apparatus 100 may obtain an area which has a predetermined color, and wherein an obstacle is not located in the space, and which has an area greater than or equal to a specific size as the aforementioned projection area.

Hereinafter, a case wherein four projection areas were obtained through scanning of an ambient space as described above is assumed (1310). In case the first user 10 who did not set the Do Not Disturb mode and the second user 20 who set the Do Not Disturb mode are located in such an environment, if the first user 10 inputs a command for displaying an image, the electronic apparatus 100 may exclude the projection areas (the first priority, the third priority) located in the gaze area of the second user 20 among the plurality of projection areas, and determine one of the remaining projection areas (the second priority, the fourth priority) as an area wherein the image will be projected (1320). For example, in the illustrated example, the projection areas of the first priority and the third priority are located in the gaze area of the second user, and thus the electronic apparatus 100 may determine one of the second priority or the fourth priority as a projection area. Here, as the second priority has a higher priority than the fourth priority, the electronic apparatus 100 may determine that the image will be projected in the projection area of the second priority.

When an area for projection is determined as above, the electronic apparatus 100 may move to a location appropriate for projecting an image on the determined area, and in the location, project the image on the determined projection area (1330).

Meanwhile, in a reproducing process of a content such as a movie, etc., a sound output is also necessary. In case the second user 20 who set the Do Not Disturb mode is located near as illustrated in the drawing, a sound output may be impossible. In this case, the electronic apparatus 100 may perform a speech to text (STT) process on a sound for the displayed content and display a text instead of the sound, or display subtitle information (e.g., activation of a subtitle function or caption on) provided by the content selected by the user.

Meanwhile, in the illustrated example, it was explained that there is a projection area beyond the gaze range of the second user 20 among the plurality of projection areas, and an image is projected through the projection area. However, in case there is no projection area beyond the gaze range of the second user 20, the electronic apparatus 100 may not directly perform displaying of an image according to a user's request, but determine a method of performing displaying on the user terminal apparatus of the user who made the request. Alternatively, the electronic apparatus 100 may display a message requesting moving to another space which is not the space.

Figure 14:
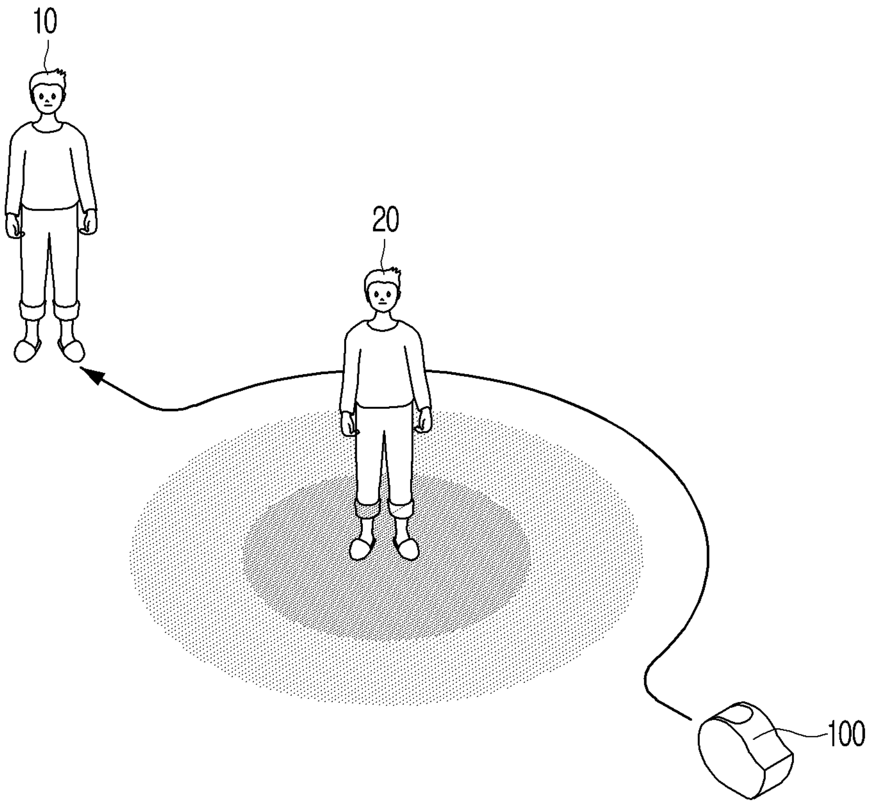
FIG. 14 is a diagram for illustrating a moving operation of an electronic apparatus in case some users among a plurality of users set a Do Not Disturb mode according to an embodiment of the disclosure.

FIG. 14 is a diagram for illustrating a moving operation of an electronic apparatus in case some users among a plurality of users set a Do Not Disturb mode according to an embodiment of the disclosure.

Figure 15:
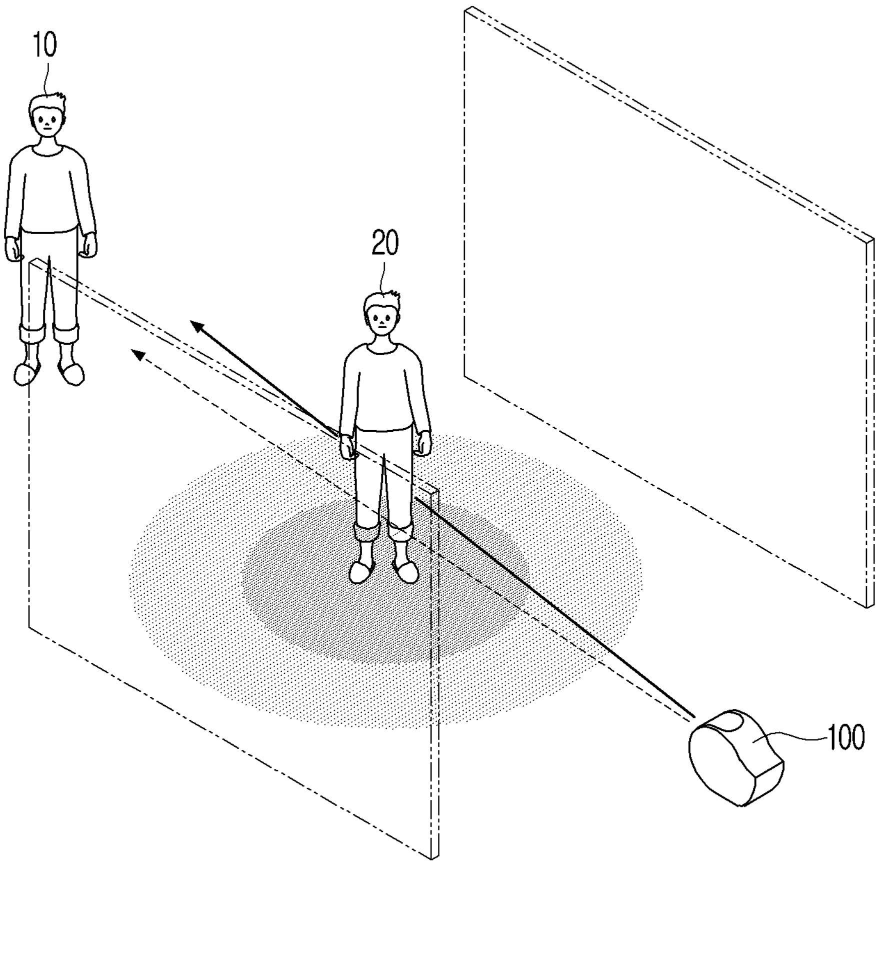
FIG. 15 is a diagram for illustrating a moving operation of an electronic apparatus in case some users among a plurality of users set a Do Not Disturb mode according to an embodiment of the disclosure.

FIG. 15 is a diagram for illustrating a moving operation of an electronic apparatus in case some users among a plurality of users set a Do Not Disturb mode according to an embodiment of the disclosure.

FIGS. 14 and 15 are diagrams for illustrating a moving operation of an electronic apparatus in case some users among a plurality of users set a Do Not Disturb mode.

Referring to FIG. 14, the first user 10 who did not set a Do Not Disturb mode and the second user 20 who set a Do Not Disturb mode are located.

If the first user 10 calls the electronic apparatus 100, and the second user 20 is located between the first user 10 and the electronic apparatus 100 in such an environment, the electronic apparatus 100 may move while maintaining a distance as much as the predetermined distance based on the location of the second user 20 as illustrated in FIG. 14. The aforementioned predetermined distance may be based on a sound (or a noise dB) generated during moving of the electronic apparatus 100. That is, the predetermined distance may be a distance which falls under a case wherein the user who set the Do Not Disturb mode cannot recognize a sound generated according to moving of the electronic apparatus 100, in case the electronic apparatus 100 is distanced as much as the predetermined distance or more.

In this aspect, the aforementioned predetermined distance may be set differently for each type of the electronic apparatus 100. Also, sensitivity to a noise may vary for each user. For example, there may be a person who is sensitive even to a small noise, and there may be a person who is insensitive to a noise. Accordingly, the electronic apparatus 100 may store information on noise sensitivity for each user, and may use a distance corresponding to the aforementioned noise sensitivity.

As described above, while the electronic apparatus 100 is moving according to a call of the first user 10, if the second user 20 who set the Do Not Disturb mode is recognized, the electronic apparatus 100 may identify the predetermined distance based on the noise sensitivity figured out in advance, and use a route where the electronic apparatus 100 can move while maintaining the identified predetermined distance.

Meanwhile, in a case wherein the electronic apparatus 100 just needs to maintain the predetermined distance, there may be various moving routes of the electronic apparatus 100. For example, in the illustrated example, there may be various routes through which the electronic apparatus 100 moves to the rear side of the second user 20, and moves to the front side of the second user 20.

In such a case, the electronic apparatus 100 may avoid the gaze area of the second user among the plurality of routes, or use a route wherein the time when the electronic apparatus 100 is included in the gaze area is the shortest.

If there is no route wherein the electronic apparatus 100 can move in a state of being distanced from the second user 20 as much as the predetermined distance as illustrated in FIG. 15, i.e., if the distanced location is blocked by a wall, or the current location is a passage, the electronic apparatus 100 may determine a moving route of passing within a specific distance from the second user 20.

Meanwhile, while moving in the route, if the distance from the second user 20 is within the predetermined distance, the electronic apparatus 100 may reduce the moving speed, and thereby reduce the noise generated by moving. Then, if the distance from the user becomes far again, the electronic apparatus 100 may move to the first user 10 at the original driving speed.

Meanwhile, speed change as above may have a form of gradual steps. Alternatively, the aforementioned speed change may be linear. For example, in case there is no generation of a noise according to speed change, gradual speed change may be used. In contrast, in case a noise is generated in a gradual speed change process, a method of linearly increasing or decreasing the speed may be used.

Figure 16:
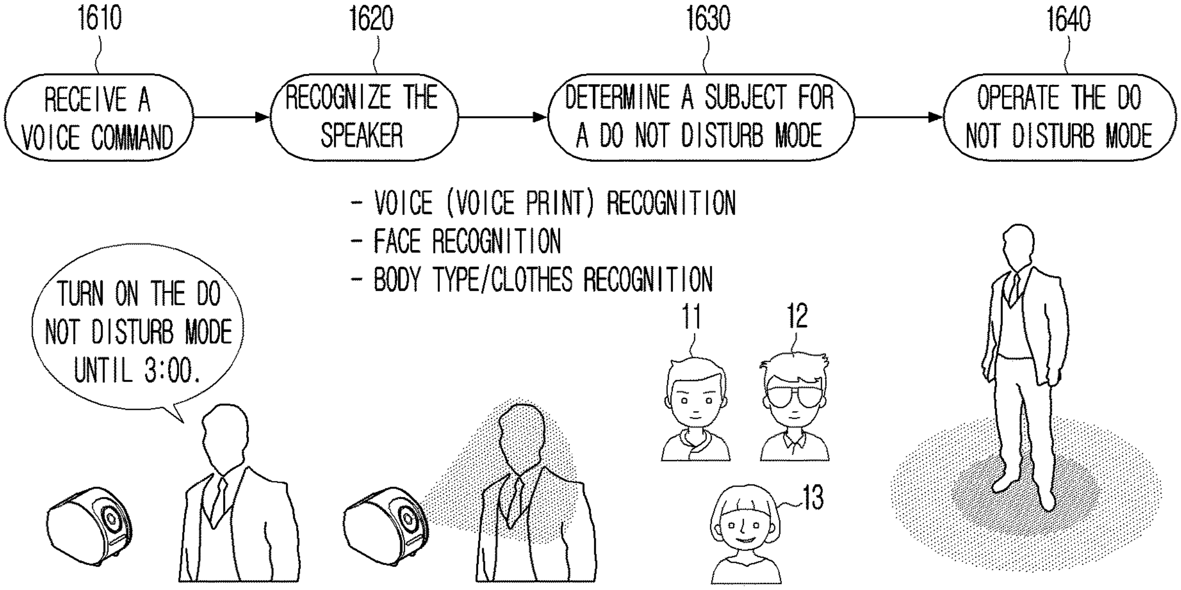
FIG. 16 is a diagram for illustrating a user identifying operation according to an embodiment of the disclosure.

FIG. 16 is a diagram for illustrating a user identifying operation according to an embodiment of the disclosure.

Specifically, FIG. 16 explains an operation in a case wherein the electronic apparatus 100 directly sets a Do Not Disturb mode.

Referring to FIG. 16, a user may set a Do Not Disturb mode through an utterance in operation 1610. Here, the electronic apparatus 100 may receive the content of the utterance through the microphone, and recognize that it is a setting operation of a Do Not Disturb mode through voice recognition for the content of the utterance.

Here, for identifying for whom the setting of the Do Not Disturb mode is, the electronic apparatus 100 may recognize the speaker in consideration of voice recognition, face recognition, the body time, etc. in operation 1620.

Such recognition may be based on the information for each user 11, 12, 13 stored in advance, and may determine who the recognized user is among the prestored users in operation 1630.

When the Do Not Disturb mode for a specific user among the prestored users is set as above, the Do Not Disturb mode for the user may be set in operation 1640.

If the Do Not Disturb mode is set as above, the electronic apparatus 100 may transmit a message notifying to the users other than the user who set the Do Not Disturb mode that the Do Not Disturb mode has been set, through the user terminal apparatuses of each user.

Meanwhile, in the above, it was explained that, based on an utterance of a user, the speaker is set as a subject of a Do Not Disturb mode, but in actual implementation, another subject other than the speaker may be set. For example, for kids who cannot speak yet, his/her parent may utter a voice command which is "Set the Do Not Disturb mode for the kid!" instead of the kid, and the electronic apparatus 100 can set the Do Not Disturb mode for the kids 11, 12, 13 according to the voice command without separate analysis of the speaker.

Meanwhile, in actual implementation, an utterance prohibition mode may be set restrictively by another person. As described above, the utterance prohibition mode may be set with a kid as a subject, or only for animals that are not humans.

Meanwhile, in the above, setting of a Do Not Disturb mode for a pre-registered user was explained, but in case a user who ordered the aforementioned Do Not Disturb mode is not a registered user, the electronic apparatus 100 may ignore the command, or perform an operation of registering the user as a new user according to the setting state. Alternatively, the electronic apparatus 100 may proceed with a procedure of receiving confirmation that another user registered a new user, or the new user has authority to use the electronic apparatus 100, etc.

Figure 17:
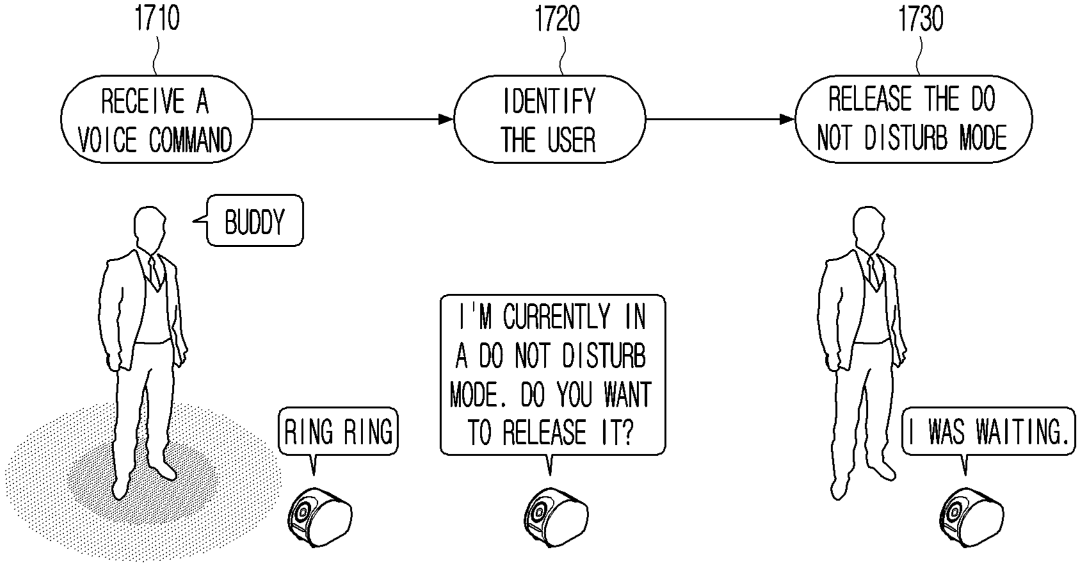
FIG. 17 is a diagram for illustrating an example of a method of releasing a Do Not Disturb mode according to an embodiment of the disclosure.

FIG. 17 is a diagram for illustrating an example of a method of releasing a Do Not Disturb mode according to an embodiment of the disclosure.

Referring to FIG. 17, a state wherein the electronic apparatus was called while a user set an utterance prohibition mode is illustrated in operation 1710. For example, a user may utter a call name of the electronic apparatus. Such a call name may be set variously. Also, while it was illustrated that the electronic apparatus is called through a user's voice, in actual implementation, it is also possible to call the electronic apparatus by using a remote control that can control the electronic apparatus, a user terminal apparatus, etc.

If such a call is generated, the electronic apparatus 100 may identify the user and display a message, or output a notification notifying that it is currently set in the Do Not Disturb mode in operation 1720.

In response to displaying of a message or outputting of a notification as above, if release of the setting of the Do Not Disturb mode is input through a voice or an interaction, the electronic apparatus 100 may release the Do Not Disturb mode for the user who made the request in operation 1730.

In the above, it was illustrated and explained that the Do Not Disturb mode is released through a user's additional confirmation, but in actual implementation, if a user's call or a request of a specific operation, etc. are input, the Do Not Disturb mode may be released without a separate confirmation process.

Figure 18:
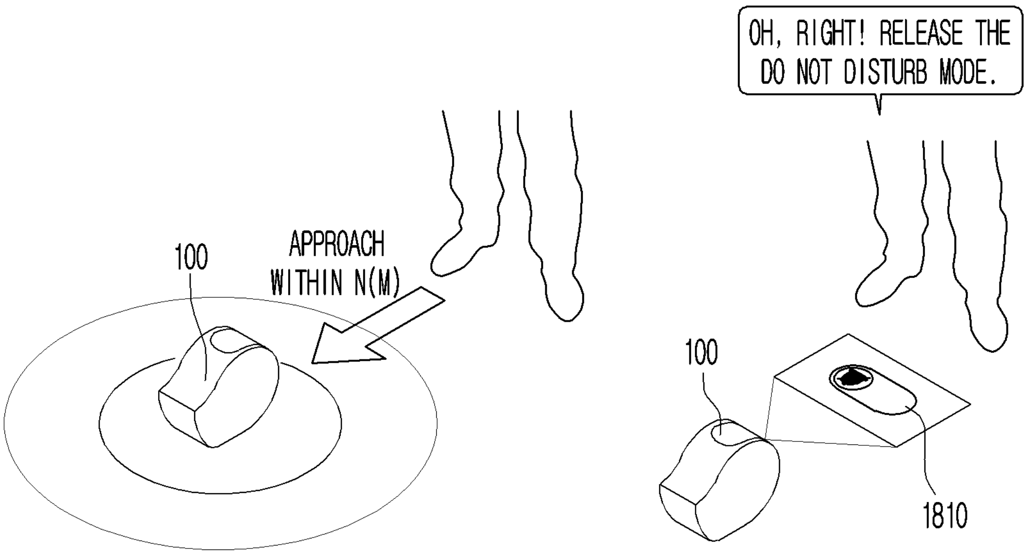
FIG. 18 is a diagram for illustrating an example of a method of releasing a Do Not Disturb mode according to an embodiment of the disclosure.

FIG. 18 is a diagram for illustrating an example of a method of releasing a Do Not Disturb mode according to an embodiment of the disclosure.

Referring to FIG. 18, an operation in a case wherein a user approached the electronic apparatus 100 while the user set an utterance prohibition mode is illustrated.

If the user approaches within a specific distance, the electronic apparatus 100 may display a message notifying that a Do Not Disturb mode is set for the current user in operation 1810.

The user who recognized such a message may request release of the Do Not Disturb mode through a voice command or another interaction, and the electronic apparatus 100 may release the Do Not Disturb mode for the user in response to such a request.

Meanwhile, in the aforementioned case, it was illustrated and explained that the electronic apparatus 100 displays the setting state of the Do Not Disturb mode in response to an approach of a specific user, but in actual implementation, in response to a user's approach, the electronic apparatus 100 may perform an operation of moving to another area such that it does not interfere with the user's moving. Also, after a user's approach, the electronic apparatus 100 may maintain the location during a predetermined time, or in case a voice command requesting a specific operation, etc. were uttered, the electronic apparatus 100 may perform the aforementioned operation for releasing the Do Not Disturb mode.

Figure 19:
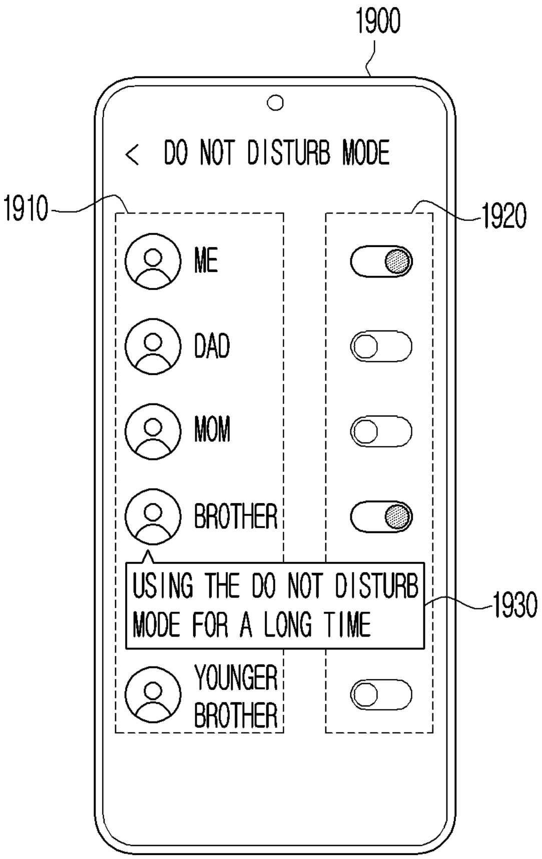
FIG. 19 is a diagram illustrating an example of a user interface window displaying a state of a Do Not Disturb mode for each user according to an embodiment of the disclosure.

FIG. 19 is a diagram illustrating an example of a user interface window displaying a state of a Do Not Disturb mode for each user according to an embodiment of the disclosure.

Referring to FIG. 19, the user interface window 1900 displays states of a Do Not Disturb mode for each of a plurality of users.

Specifically, the user interface window 1900 includes a user information area 1910 and a state display area 1920.

The user information area 1910 is an area that displays users using the electronic apparatus.

The state display area 1920 is an area that indicates whether a Do Not Disturb mode of each user was set in locations corresponding to the names (or the nicknames, etc.) of each user.

As described above, the user interface window 1900 comprehensively displays the setting states of the Do Not Disturb mode of each user, and thus a user can easily identify the states of the other users. Also, a user may directly change his/her Do Not Disturb state on the user interface window 1900.

In addition, if the Do Not Disturb state of a specific user is being maintained during a predetermined time or longer, the user interface window 1900 may display a message notifying that the Do Not Disturb state of the specific user has been maintained for a long time (1930).

Meanwhile, in the illustrated example, an example wherein, if the Do Not Disturb state of a specific user has been maintained for a long time, the user interface window 1900 that can be displayed on each user terminal apparatus is used such that the other users can recognize it was suggested. However, in actual implementation, the electronic apparatus 100 may transmit a message notifying that the current setting has been maintained for a long time to a user terminal apparatus corresponding to a user who requests interference prohibition during the predetermined time or longer.

Meanwhile, the user interface window 1900 as described above may be generated at the electronic apparatus 100, and provided to a user terminal apparatus. Alternatively, the user interface window 1900 may be generated by a home server (or a separate server) that continuously manages the states of the Do Not Disturb mode of users, and provided to a user terminal apparatus.

Figure 20:
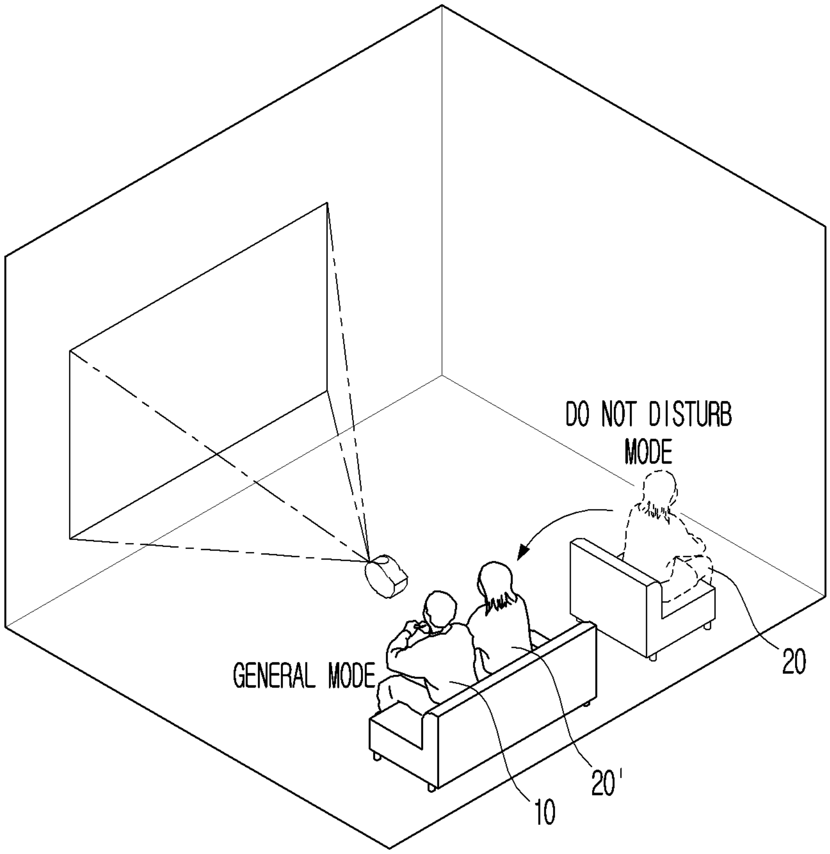
FIG. 20 is a diagram for illustrating an example of a method of releasing a Do Not Disturb mode according to an embodiment of the disclosure.

FIG. 20 is a diagram for illustrating an example of a method of releasing a Do Not Disturb mode according to an embodiment of the disclosure.

Meanwhile, in the above, an example of performing release of a Do Not Disturb mode by a user's request, etc. was illustrated and explained, but release of a Do Not Disturb mode may be performed not only in the aforementioned case, but also in a case wherein there is no direct request of a user.

Referring to FIG. 20, the user 10 who did not set the Do Not Disturb mode and the user 20 who set the Do Not Disturb are located together in a specific space. Here, a case wherein the first user was viewing a content, and the second user who set the Do Not Disturb mode joined afterwards and is viewing the content together is explained 20'.

In such a state, if the setting of the Do Not Disturb mode of the second user is maintained, operations such as stopping output of the content provided to the first user, or changing the projection direction to a different direction from the gaze direction of the second user, etc. should be performed.

However, as the moving of the second user 20 can be interpreted that the second user 20 would view the content together with the first user 10, if the second user 20 views a specific content together with the first user, the electronic apparatus 100 may release the setting of the Do Not Disturb mode for the second user 20.

In case the setting of the Do Not Disturb mode for the second user 20 was released as above, the electronic apparatus 100 may perform operations such as releasing restriction on output of a sound for a content, or expanding a projection area, etc.

Figure 21:
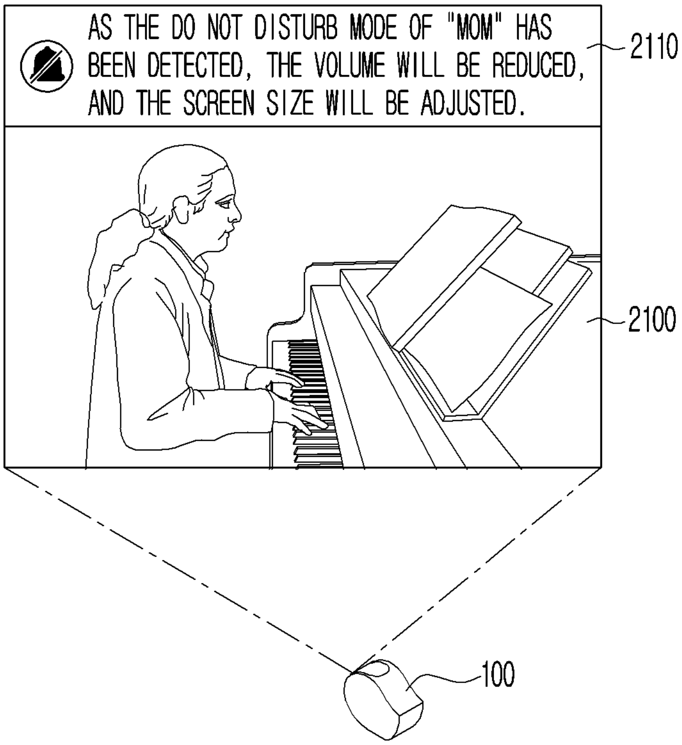
FIG. 21 is a diagram illustrating an example of a user interface window notifying a state of a Do Not Disturb mode of another person according to an embodiment of the disclosure.

FIG. 21 is a diagram illustrating an example of a user interface window notifying a state of a Do Not Disturb mode of another person according to an embodiment of the disclosure.

Referring to FIG. 21, it is an example of a user interface window 2100 that can be displayed in case a person who set a Do Not Disturb mode is near in the surroundings.

It can be identified that the user interface window 2100 displays information 2110 that a sound is not output as a person who set a Do Not Disturb mode is near in the surroundings and an image corresponding to the content together.

Accordingly, a user can recognize a state wherein the volume is reduced, or a sound is not output based on the message 2110.

Meanwhile, if such a message is displayed, a user may control the electronic apparatus 100 to provide a message requesting release of the Do Not Disturb mode to a user who set the Do Not Disturb mode in the surroundings, or request to display the content in another space which is not the current space.

In the first case, the electronic apparatus 100 may transmit a message that the current user requested release of the Do Not Disturb mode to another user who set the Do Not Disturb mode. If the user who set the Do Not Disturb mode released the Do Not Disturb mode by transmission of the message as above, the electronic apparatus 100 may increase the volume for the content, or output a sound.

In the second case, the electronic apparatus 100 may determine an optimal location (i.e., a location that does not influence the user who set the Do Not Disturb mode) in consideration of the location of the user who set the Do Not Disturb mode, and suggest moving to the determined location to the user currently viewing the content.

Figure 22:
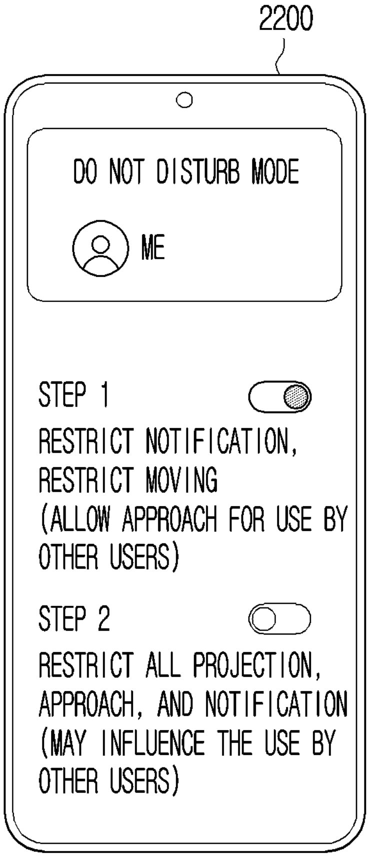
FIG. 22 is a diagram illustrating an example of a user interface window for setting of a Do Not Disturb mode according to an embodiment of the disclosure.

FIG. 22 is a diagram illustrating an example of a user interface window for setting of a Do Not Disturb mode according to an embodiment of the disclosure.

Referring to FIG. 22, an example of a user interface window 2200 that is displayed on a user terminal apparatus in case a Do Not Disturb mode consists of a plurality of steps, but not one step is illustrated.

The user interface window 2200 indicates a plurality of Do Not Disturb modes.

For example, in a Do Not Disturb mode, interference prohibition may be set only for notifications and moving, or interference prohibition may be set for all states such as projection, approach, etc.

Meanwhile, in the illustrated example, a setting form of two steps was illustrated, but in actual implementation, a form of setting steps in more detail is also possible, and it is also possible to set interference prohibition for each operation or each kind of notifications.

Figure 23:
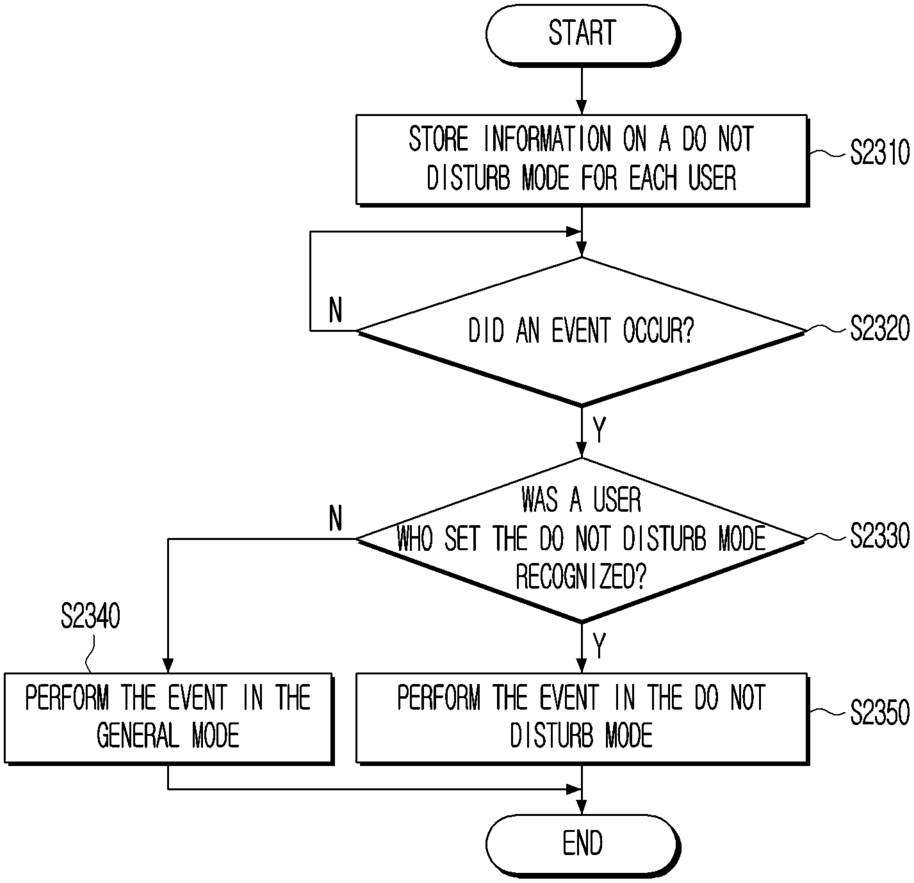
FIG. 23 is a diagram for illustrating a controlling method of an electronic apparatus according to an embodiment of the disclosure.

FIG. 23 is a diagram for illustrating a controlling method of an electronic apparatus according to an embodiment of the disclosure.

Referring to FIG. 23, a setting for a Do Not Disturb mode for each of a plurality of users using the electronic apparatus is stored in operation S2310. Such a Do Not Disturb mode for each user may be based on a user's utterance command, or may be based on information set in a user terminal apparatus for each user.

Then, it is identified whether a predetermined event occurred in operation S2320. For example, the predetermined event may be a call of a specific user or a request to perform a specific operation. Also, the predetermined event may be arrival of a predetermined notification time, or reception of notification information through a home network. In addition, the aforementioned call, etc. may not only be a call that was directly input through the microphone of the electronic apparatus 100, but may also be a call that was input through a microphone of a user terminal apparatus. For example, if the call name of the electronic apparatus is Buddy, a user may input a voice command which is "Call Buddy!" by using a user terminal apparatus. If such a voice command is input, the user terminal apparatus may provide information notifying that such a call was performed to the electronic apparatus 100.

If an event occurs, the electronic apparatus 100 may perform an operation corresponding to the event to the first user who did not set the Do Not Disturb mode. Here, the electronic apparatus 100 may first identify whether the second user who set the Do Not Disturb mode is located in the surroundings before performing an operation corresponding to the aforementioned event in operation S2330. For example, for such identification regarding whether the second user exists, an image photographed by the camera inside the electronic apparatus 100 may be used, or information such as a distance from the user terminal apparatus of the second user, etc. may be used.

If it is identified that the electronic apparatus 100 is distanced from the second user who set the Do Not Disturb mode as much as a predetermined distance or more, the electronic apparatus 100 may perform a work requested by the first user or a notification operation in the general mode in operation S2340.

In contrast, in case the second user who set the Do Not Disturb mode is within the predetermined distance, the electronic apparatus 100 may perform the work requested by the first user or a notification operation in the Do Not Disturb mode in operation S2350. That is, the electronic apparatus 100 may perform operations such as outputting a sound in a lower volume than in the general mode, or displaying an image such that the image is not displayed in the gaze area of the second user, etc.

Meanwhile, if it is difficult to perform an operation according to a request of the first user, the electronic apparatus 100 may display a message notifying that a user who set the Do Not Disturb mode exists in the surroundings. Also, the electronic apparatus 100 may display an inquiry message regarding whether it would be okay to perform a requested operation in another space other than the space.

As described above, in the controlling method of an electronic apparatus according to an embodiment of the disclosure, even in case a specific user set the Do Not Disturb mode, other users can use the electronic apparatus. Also, in performing an operation according to a user's request, in case a user who set the Do Not Disturb mode is near, the operation may be performed in the Do Not Disturb mode, or a user who requested a specific operation may be requested to move to another space, etc., and thus generation of interference to the user who set the Do Not Disturb mode can be minimized.

Figure 24:
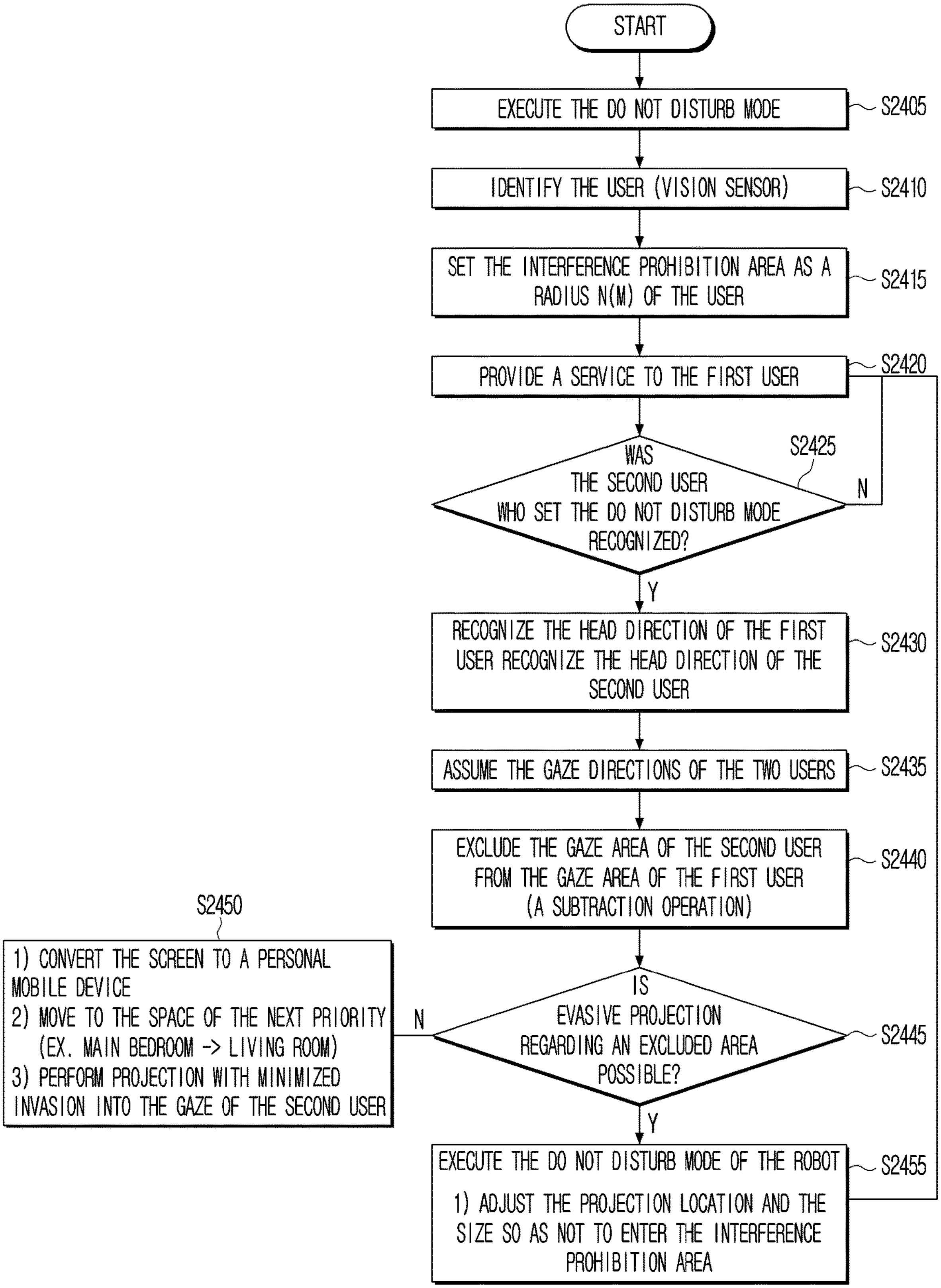
FIG. 24 is a flow chart for illustrating a displaying operation at the time of a Do Not Disturb mode according to an embodiment of the disclosure.

FIG. 24 is a flow chart for illustrating a displaying operation at the time of a Do Not Disturb mode according to an embodiment of the disclosure.

Referring to FIG. 24, the second user may set a Do Not Disturb mode in operation S2405. Such setting of a Do Not Disturb mode may be performed through a voice command or setting of a user terminal apparatus of a user. Also, the aforementioned setting of a user terminal apparatus may not only be the setting of the Do Not Disturb mode for the electronic apparatus 100, but also the setting of the Do Not Disturb mode of the user terminal apparatus itself. That is, in case a user set the Do Not Disturb mode of restricting operations of a user terminal apparatus in his/her user terminal apparatus, the electronic apparatus 100 may automatically set the Do Not Disturb mode for the user by being interlocked with this.

When the Do Not Disturb mode for a specific user is set as above, the location of the user who set the Do Not Disturb mode is obtained in operation S2410. For example, the location of the user who set the Do Not Disturb mode may be identified by using an image photographed at the electronic apparatus 100, or using a distance between user terminal apparatuses of users, etc.

When the Do Not Disturb mode is set, and the location of the user is identified as above, the electronic apparatus 100 may set an area within a predetermined distance based on the space wherein the user is currently located as the interference prohibition area in operation S2415. Meanwhile, in case the electronic apparatus 100 has map information having information on a plurality of rooms, the electronic apparatus 100 may set interference prohibition areas in room units.

In such a state, the electronic apparatus 100 may provide a service corresponding to a request of the first user according to the request of the first user in operation S2420.

Here, the electronic apparatus 100 may identify whether the location wherein the operation according to the request of the first user is performed is within the predetermined distance from the second user who set the Do Not Disturb mode in operation S2425. In the case of a distanced location, the electronic apparatus 100 may perform the operation according to the request of the first user, and in the case of not being in the same space but being within the predetermined distance, the electronic apparatus 100 may make the operation performed in a lower volume than in the general mode, etc. in operation S2455.

Meanwhile, if the second user is identified in the current space according to the user's request in operation S2425-Y, the electronic apparatus 100 may identify the gaze directions (or the head directions) of the first user and the second user in operations S2430 and S2435. For example, the electronic apparatus 100 may photograph the two users by using the camera, and identify the gaze directions of the two users by using the photographed image.

When the two gaze directions are identified, the electronic apparatus 100 may determine a projection area that is not included in the gaze direction of the second user, but is included in the gaze direction of the first user in operation S2440.

Meanwhile, if the size of the determined projection area is smaller than a predetermined size, or a projection area cannot be determined in operation S2445-N, the electronic apparatus 100 may determine that the request of the first user cannot be performed in the current state, and reproduce an image on the user terminal apparatus of the first user, or notify moving to another space to the user in operation S2450.

If the projection area is determined, the electronic apparatus 100 may display an image on the determined projection area in operation S2455.

Figure 25:
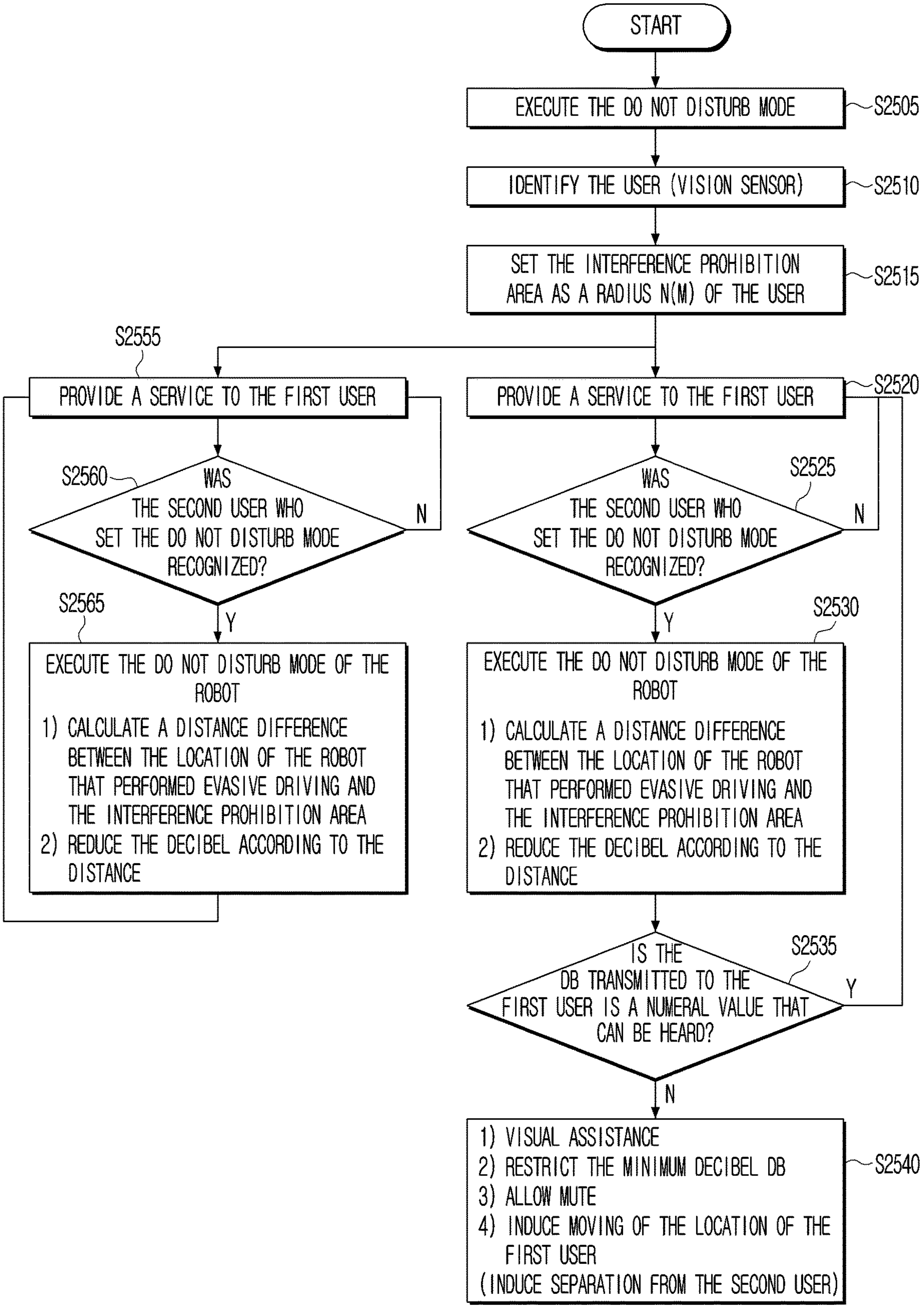
FIG. 25 is a flow chart for illustrating change of a setting state of a Do Not Disturb mode according to an embodiment of the disclosure.

FIG. 25 is a flow chart for illustrating change of a setting state of a Do Not Disturb mode according to an embodiment of the disclosure.

Referring to FIG. 25, the second user may set a Do Not Disturb mode in operation S2505. When the Do Not Disturb mode for a specific user is set as above, the location of the user who set the Do Not Disturb mode is obtained in operation S2510. When the Do Not Disturb mode is set, and the location of the user is identified as above, the electronic apparatus 100 may set an area within the predetermined distance based on the space wherein the user is currently located as an interference prohibition area in operation S2515. As the operations in operations S2505-S2515 were explained above in FIG. 24, overlapping explanation will be omitted.

First, an operation in case a request related to reproduction of music was input from the first user is explained. For example, if the user requests reproduction of music, the electronic apparatus 100 may perform the requested reproduction of music in operation S2520.

Here, the electronic apparatus 100 may identify whether the location wherein an operation according to the request of the first user is performed is within the predetermined distance from the second user who set the Do Not Disturb mode in operation S2525. In the case of a distanced location, the electronic apparatus 100 may perform the operation according to the request of the first user and proceed with the operation in a general volume, and in the case of not being in the same space but being within the predetermined distance, the electronic apparatus 100 may make the operation performed in a lower volume than in the general mode, etc. in operation S2530. Such a standard may be a distance standard, and determination may also be made based on whether a sound is a sound that can be heard by the ears of the second user based on the distance between the electronic apparatus 100 and the second user, the current volume, etc.

If the current volume was determined to be one that can be heard by the ears of the second user, the electronic apparatus 100 may perform an operation of reducing the output volume in operation S2530.

Meanwhile, it may be additionally determined whether the determined output volume can be heard by the first user in operation S2535. For example, if the volume was reduced in consideration of the second user, but cannot be heard by the first user, the second user may not recognize whether the operation according to the request of the second user is being performed.

Accordingly, the electronic apparatus 100 may perform operations such as displaying a message notifying to the first user that the volume was reduced, or requesting to the first user to move to another place, or requesting allowance of the first user or the second user regarding whether it would be okay to raise the volume in operation S2540.

Meanwhile, if the request of the first user is a call that calls the electronic apparatus 100, the electronic apparatus 100 may perform moving to the surroundings of the first user in response to the request of the first user. Meanwhile, in the illustrated example, it was explained that the electronic apparatus 100 moves to the surroundings of the first user in response to the request of the first user, but if the request of the first user is moving to a specific place, the electronic apparatus 100 may perform moving to the specific space according to the request of the first user.

Meanwhile, if the second user who set the Do Not Disturb mode was recognized during the aforementioned moving in operation S2560-Y, the electronic apparatus 100 may move while maintaining the predetermined distance from the second user, or perform moving in the Do Not Disturb mode of adjusting the moving speed during moving in operation S2565. Detailed explanation regarding the operation will be described below in FIG. 26.

Figure 26:
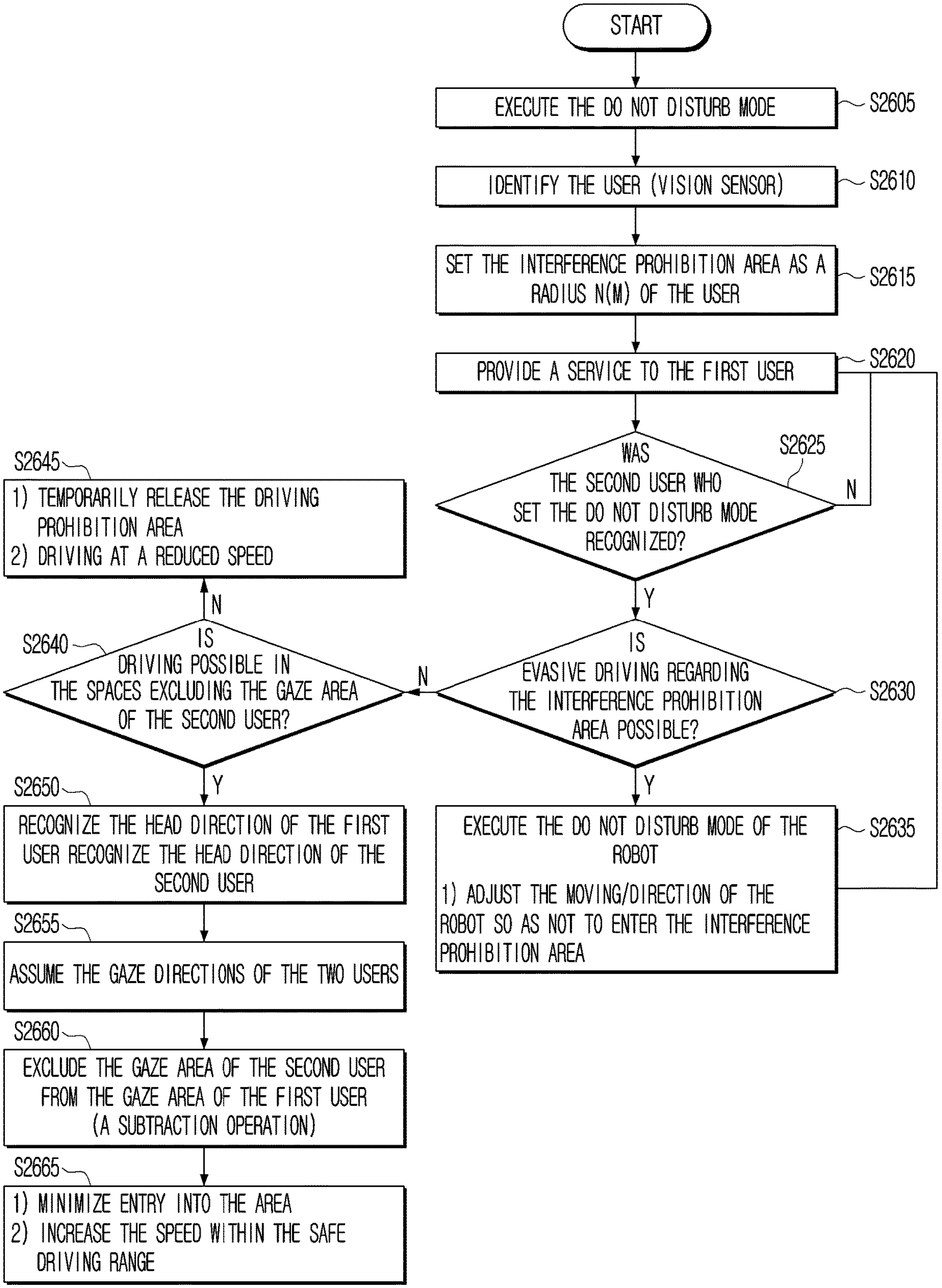
FIG. 26 is a flow chart for illustrating a driving operation at the time of a Do Not Disturb mode according to an embodiment of the disclosure.

FIG. 26 is a flow chart for illustrating a driving operation at the time of a Do Not Disturb mode according to an embodiment of the disclosure.

Referring to FIG. 26, the second user may set a Do Not Disturb mode in operation S2605. If a Do Not Disturb mode for a specific user is set as above, the location of the user who set the Do Not Disturb mode is obtained in operation S2610. When the Do Not Disturb mode is set, and the location of the user is identified as above, the electronic apparatus 100 may set an area within the predetermined distance based on the space wherein the user is currently located as an interference prohibition area in operation S2615. As the operations in operations S2605-S2615 were explained above in FIG. 24, overlapping explanation will be omitted.

Meanwhile, if a request of the first user is a call that calls the electronic apparatus 100, the electronic apparatus 100 may perform moving to the surroundings of the first user in response to the request of the first user in operation S2620. Meanwhile, in the illustrated example, it was explained that the electronic apparatus 100 moves to the surroundings of the first user in response to the request of the first user, but if the request of the first user is moving to a specific place, the electronic apparatus 100 may perform moving to the specific space according to the request of the first user.

Meanwhile, if the second user who set the Do Not Disturb mode was recognized during the aforementioned moving in operation S2625-Y, the electronic apparatus 100 may identify whether it would be possible to move in the moving route while being distanced from the second user as much as the predetermined distance or more in operation S2640. If it is possible to move in the moving route while being distanced from the second user as much as the predetermined distance or more in operation S2630-Y, the electronic apparatus 100 move while maintaining the predetermined distance from the second user in operation S2635.

If it is impossible to move in the moving route while being distanced from the second user as much as the predetermined distance or more in operation S2630-N, the electronic apparatus 100 may identify whether it would be possible to move in the opposite direction to the gaze direction of the second user in operation S2640.

If it is impossible to move in the opposite direction to the gaze direction, the electronic apparatus 100 may temporarily release the driving prohibition area, and move by reducing the speed in operation S2645.

If it is possible to move in the opposite direction to the gaze direction, the electronic apparatus 100 may obtain the gaze directions of the two users in operations S2650 and S2655, and perform moving by setting the moving route in a form of avoiding the gaze direction of the second user in operation S2660. Here, within the predetermined distance from the second user, the electronic apparatus 100 may move by reducing the moving speed, and if the electronic apparatus 100 is distanced from the second user by greater than or equal to a specific distance, the electronic apparatus 100 may move in a normal speed in operation S2665.

Meanwhile, methods according to at least some of the aforementioned various embodiments of the disclosure may be implemented in forms of applications that can be installed on conventional electronic apparatuses.

Also, the methods according to at least some of the aforementioned various embodiments of the disclosure may be implemented just with software upgrade, or hardware upgrade of conventional electronic apparatuses.

In addition, it is possible that the methods according to at least some of the aforementioned various embodiments of the disclosure are performed through an embedded server provided on an electronic apparatus, or an external server of at least one of electronic apparatuses.

Meanwhile, according to an embodiment of the disclosure, the aforementioned various embodiments may be implemented as software including instructions stored in machine-readable storage media, which can be read by machines (e.g.: computers). The machines refer to apparatuses that call instructions stored in a storage medium, and can operate according to the called instructions, and the apparatuses may include an electronic apparatus according to the embodiments disclosed herein (e.g.: an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'a non-transitory storage medium' only means that a storage medium is tangible, and does not include signals (e.g.: electromagnetic waves), and the term does not distinguish a case wherein data is stored semi-permanently in a storage medium and a case wherein data is stored temporarily. For example, 'a non-transitory storage medium' may include a buffer wherein data is temporarily stored.

Also, according to an embodiment, the methods according to the various embodiments described in the disclosure may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed directly on-line (e.g.: download or upload) through an application store (e.g.: Play Store™), or between two user apparatuses (e.g.: smartphones). In the case of on-line distribution, at least a portion of a computer program product (e.g.: a downloadable app) may be stored in a storage medium readable by machines such as the server of the manufacturer, the server of the application store, and the memory of the relay server at least temporarily, or may be generated temporarily.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:

a display;

a sensor;

a moving device configured to move the electronic apparatus;

memory storing at least one instruction; and at least one processor communicatively coupled to the display, the sensor, the moving device, and the memory, wherein the at least one instruction, when executed by the at least one processor individually or collectively, causes the electronic apparatus to:

identify a set state of a Do Not Disturb mode for each of a plurality of users using the electronic apparatus, and based on a predetermined event occurring, perform an operation corresponding to the predetermined event for a first user who did not set the Do Not Disturb mode among the plurality of users, wherein the predetermined event includes at least one of a call of a specific user among the plurality of users, an arrival of a predetermined notification time, reception of notification information through a home network, an operation of outputting a notification as sound, or an operation of displaying an image, and wherein the performing of the operation corresponding to the predetermined event comprises, based on recognizing a second user who set the Do Not Disturb mode being located within a predetermined distance from the electronic apparatus among the plurality of users, perform the operation corresponding to the predetermined event in the Do Not Disturb mode.

2. The electronic apparatus of claim 1, wherein the at least one instruction, when executed by the at least one processor individually or collectively, further causes the electronic apparatus to:

based on an event of providing at least one image to the first user who did not set the Do Not Disturb mode occurring, control the moving device such that the electronic apparatus moves to surroundings of the first user; and control the display to display the at least one image corresponding to the event.

3. The electronic apparatus of claim 2, wherein the at least one instruction, when executed by the at least one processor individually or collectively, further causes the electronic apparatus to:

based on identifying that the second user who set the Do Not Disturb mode among the plurality of users is located within the predetermined distance from the electronic apparatus, control the moving device such that the electronic apparatus moves to a location that does not fall under a gaze area of the second user among ambient areas of the first user.

4. The electronic apparatus of claim 1, further comprising:

a speaker, wherein the at least one instruction, when executed by the at least one processor individually or collectively, further causes the electronic apparatus to:

based on an event of providing predetermined information to the first user occurring, control the moving device such that the electronic apparatus moves to surroundings of the first user who did not set the Do Not Disturb mode, and control the speaker to output a-sound corresponding to the event.

5. The electronic apparatus of claim 4, wherein the at least one instruction, when executed by the at least one processor individually or collectively, further causes the electronic apparatus to:

based on identifying that the second user who set the Do Not Disturb mode among the plurality of users is located within the predetermined distance of the electronic apparatus, reduce an output volume of the sound corresponding to the event to a reduced output volume; and control the speaker to output the sound corresponding to the event in the reduced output volume.

6. The electronic apparatus of claim 5, wherein the at least one instruction, when executed by the at least one processor individually or collectively, further causes the electronic apparatus to:

determine the output volume based on a distance between the electronic apparatus and the second user; and based on the determined output volume being lower than a recognizable volume of the first user, control the display to display visual information corresponding to the sound to be output.

7. The electronic apparatus of claim 1, wherein the at least one instruction, when executed by the at least one processor individually or collectively, further causes the electronic apparatus to:

based on an event of the electronic apparatus moving to surroundings of the first user who did not set the Do Not Disturb mode occurring, control the moving device such that the electronic apparatus moves to the surroundings of the first user; and based on recognizing the second user who set the Do Not Disturb mode among the plurality of users during the moving, control the moving device such that the electronic apparatus moves in a moving route distanced from the second user as much as the predetermined distance.

8. The electronic apparatus of claim 1, wherein the at least one instruction, when executed by the at least one processor individually or collectively, further causes the electronic apparatus to:

based on an event of moving to surroundings of the first user who did not set the Do Not Disturb mode occurring, set a moving route for moving to the surroundings of the first user and control the moving device such that the electronic apparatus moves along the set moving route; and in a section of the set moving route where a distance between the electronic apparatus and the second user who set the Do Not Disturb mode among the plurality of users becomes within the predetermined distance, control the moving device such that the electronic apparatus moves by reducing a moving speed of the electronic apparatus.

9. The electronic apparatus of claim 2, wherein the at least one instruction, when executed by the at least one processor individually or collectively, further causes the electronic apparatus to:

obtain a gaze area of the second user; and set a moving route such that the moving route is not included in the gaze area.

10. The electronic apparatus of claim 1, further comprising:

a microphone, wherein the sensor comprises a camera, and wherein the at least one instruction, when executed by the at least one processor individually or collectively, further causes the electronic apparatus to:

identify a person speaking by using a voice input through the microphone and an image photographed through the camera, and based on an input voice command, set the Do Not Disturb mode for the identified person speaking or a user included in the voice command.

11. The electronic apparatus of claim 1, wherein the sensor comprises a camera, and wherein the at least one instruction, when executed by the at least one processor individually or collectively, further causes the electronic apparatus to:

identify a user by using an image photographed through the camera; and based on a posture of the user being a predetermined posture, set the Do Not Disturb mode for the identified user.

12. The electronic apparatus of claim 1, wherein the memory further stores map information for a space in which the electronic apparatus is located, and wherein the at least one instruction, when executed by the at least one processor individually or collectively, further causes the electronic apparatus to:

identify a location area of the space in which a user who set the Do Not Disturb mode is located among a plurality of spaces in the map information, and operate in the Do Not Disturb mode in the location area in which the user who set the Do Not Disturb mode is located.

13. The electronic apparatus of claim 12, wherein the at least one instruction, when executed by the at least one processor individually or collectively, further causes the electronic apparatus to:

display a list of the plurality of users using the electronic apparatus; and display an indicator indicating a Do Not Disturb mode setting for each user of the list of the plurality of users.

14. The electronic apparatus of claim 13, wherein the at least one instruction, when executed by the at least one processor individually or collectively, further causes the electronic apparatus to:

display a message if a Do Not Disturb mode of a user, of the list of the plurality of users, has been maintained for a predetermined amount of time or longer.

15. A method performed by a movable electronic apparatus, the method comprising:

storing a setting for a Do Not Disturb mode for each of a plurality of users using the movable electronic apparatus; and based on a predetermined event occurring, performing an operation corresponding to the predetermined event for a first user who did not set the Do Not Disturb mode among the plurality of users, wherein the predetermined event includes at least one of a call of a specific user among the plurality of users, an arrival of a predetermined notification time, reception of notification information through a home network, an operation of outputting a notification as sound, or an operation of displaying an image, and wherein the performing of the operation corresponding to the predetermined event comprises, based on recognizing a second user who set the Do Not Disturb mode being located within a predetermined distance from the movable electronic apparatus among the plurality of users, performing the operation corresponding to the predetermined event in the Do Not Disturb mode.

16. The method of claim 15, further comprising:

based on an event of providing an image to the first user who did not set the Do Not Disturb mode occurring, controlling a moving device of the movable electronic apparatus such that the movable electronic apparatus moves to surroundings of the first user; and controlling a display to display an image corresponding to the event.

17. The method of claim 16, further comprising:

based on identifying that the second user who set the Do Not Disturb mode is located within the predetermined distance from the movable electronic apparatus, controlling the moving device such that the movable electronic apparatus moves to a location that does not fall under a gaze area of the second user among ambient areas of the first user.

18. The method of claim 15, further comprising:

based on an event of providing predetermined information to the first user occurring, controlling a device moving of the movable electronic apparatus such that the movable electronic apparatus moves to surroundings of the first user who did not set the Do Not Disturb mode, and controlling a speaker to output sound corresponding to the event.

19. The method of claim 18, further comprising:

based on identifying that the second user who set the Do Not Disturb mode is located within the predetermined distance from the movable electronic apparatus, reducing an output volume of the sound corresponding to the event to a reduced output volume; and controlling the speaker to output the sound corresponding to the event in the reduced output volume.

20. One or more non-transitory computer-readable recording media storing one or more computer programs including computer executable instructions that, when executed by one or more processors of a movable electronic apparatus individually or collectively, cause the movable electronic apparatus to perform operations, the operations comprising:

storing a setting for a Do Not Disturb mode for each of a plurality of users using the movable electronic apparatus, and based on a predetermined event occurring, performing an operation corresponding to the predetermined event for a first user who did not set the Do Not Disturb mode among the plurality of users, wherein the predetermined event includes at least one of a call of a specific user among the plurality of users, an arrival of a predetermined notification time, reception of notification information through a home network, an operation of outputting a notification as sound, or an operation of displaying an image, and wherein the performing of the operation corresponding to the predetermined event comprises, based on recognizing a second user who set the Do Not Disturb mode being located within a predetermined distance from the movable electronic apparatus among the plurality of users, performing the operation corresponding to the predetermined event in the Do Not Disturb mode.

21. The one or more non-transitory computer-readable storage media of claim 20, the operations further comprising:

based on an event of providing an image to the first user who did not set the Do Not Disturb mode occurring, controlling a moving device of the movable electronic apparatus such that the movable electronic apparatus moves to surroundings of the first user; and controlling a display to display an image corresponding to the event.

* * * * *